United States Patent [19]

Muri

[11] Patent Number: 4,513,385

[45] Date of Patent: Apr. 23, 1985

[54] APPARATUS AND METHOD FOR SUPPRESSING SIDE LOBE RESPONSE IN A DIGITALLY SAMPLED SYSTEM

[75] Inventor: David L. Muri, Sunrise, Fla.

[73] Assignee: Motorola, Inc., Schaumburg, Ill.

[21] Appl. No.: 462,494

[22] Filed: Jan. 31, 1983

[51] Int. Cl.[3] ............................................ G06F 3/05

[52] U.S. Cl. .................................. 364/572; 364/574; 364/724; 343/379; 367/905

[58] Field of Search ............... 364/572, 574, 724, 726; 343/379; 333/166; 367/905

[56] References Cited

U.S. PATENT DOCUMENTS

| | | | |
|---|---|---|---|
| 4,057,802 | 11/1977 | Dollinger | 343/379 |
| 4,095,225 | 6/1978 | Erikmats | 364/572 |
| 4,156,876 | 5/1979 | Debuisser | 333/166 |
| 4,216,463 | 8/1980 | Backof, Jr. et al. | 364/724 |
| 4,259,650 | 3/1981 | Donahue | 333/166 |
| 4,291,396 | 9/1981 | Martin | 367/905 |
| 4,302,817 | 11/1981 | Labedz | 364/724 |

OTHER PUBLICATIONS

Prabhu et al., "Optimised Data Windows", Electronics Letters, Jan. 1980, vol. 16, No. 1, pp. 38–40.

Harris, "On the Use of Windows for Harmonic Analysis with the Discrete Fourier Transform", Proceedings of IEEE, vol. 66, No. 1, Jan. 1978, pp. 51–83.

M6805/M146805 Microcomputer/Microprocessor Users Manual, published by Motorola, Inc., 3501 Ed Bluestein Blvd., Austin Texas 78721.

Motorola MC146805G2 CMOS 8-Bit Microcomputer Advanced Information Data Sheet published by Motorola, Inc., Austin Texas.

Motorola MCM2802 MOS EEPROM Advance Information Data Sheet, Published by Motorola, Inc. Austin, Texas.

Digital Signal Processing by Oppenheim and Schafer, published by Prentice Hall, Inc. Section 5.5-Design of FIR Filters Using Window, pp. 239–250.

*Primary Examiner*—Jerry Smith

*Assistant Examiner*—Karl Huang

*Attorney, Agent, or Firm*—Joseph T. Downey; Edward M. Roney; James W. Gillman

[57] ABSTRACT

A decoder circuit is provided which employs digital sampling and correlation apparatus to detect the presence of a received tone signal exhibiting a predetermined frequency. Samples of received tone signals are taken and, in effect, multiplied by a substantially rectangular observation window which includes a bite interval of selected duration and location therein. A correlator correlates the windowed samples to detect samples corresponding to the predetermined frequency (main lobe frequency). A significant decrease in undesired side lobe response is thus achieved.

59 Claims, 22 Drawing Figures

1
0
0
TIME 1
0
T1
1
TIME 1
0
0
.82
1
TIME 1
0
TIME 1
0
.82
.94
1
TIME 1
0
TIME 1
0
0
.82
.94
1.0
T1
TIME

APPARATUS AND METHOD FOR SUPPRESSING SIDE LOBE RESPONSE IN A DIGITALLY SAMPLED SYSTEM

BACKGROUND OF THE INVENTION

This invention relates to electrical circuits responsive to signals having a predetermined frequency and, more particularly to apparatus for detecting the presence of a signal exhibiting a predetermined frequency.

DESCRIPTION OF THE PRIOR ART

One conventional technique for detecting the presence of a signal exhibiting a predetermined frequency is an analog inductor-capacitor type filter tuned to the predetermined frequency and coupled to a threshold detector. When a signal waveform containing the signal exhibiting the predetermined frequency is applied to the analog filter, such signal flows in a substantially unattenuated manner to the output of the filter. Since all other signals are substantially attenuated, only signals having substantial signal energy at or near the predetermined frequency of the tuned filter will reach the threshold detector and be detected thereby. The approach just described constitutes a selective frequency signal detector employing a passive filter. It is known that circuits for detecting signals of predetermined frequency are also implemented by employing active filters.

Digital filters such as the finite impulse response (FIR) filters described in Digital Signal Processing by Oppenheim and Schafer, published by Prentice Hall Inc., 1975, pages 239–250, the text of which is incorporated herein by reference, may be employed to select a signal exhibiting substantial energy at or near a predetermined frequency and to reject signals exhibiting other frequencies. In this approach an input signal is sampled at a predetermined rate to generate signal samples. The conventional digital bandpass filter operates on such samples in a manner such that, in effect, a pass-band is formed for signals exhibiting energy at or near the desired predetermined frequency and, stop bands are formed for signals exhibiting other frequencies. It is known that increasing the number of samples taken per unit time increases the performance capabilities of the digital filter in terms of maximum allowable input frequency. However, this approach has substantial limitations in that as the number of samples taken increases, the amount of computational time consumed likewise substantially increases.

One digital filtering technique is to observe the samples of the unknown signal during a finite duration window or observation window. One window which may be employed is the rectangular window shown in FIG. 2 and discussed by Oppenheim and Schafer in the aforementioned text. All samples which occur during such a rectangular window are by definition multiplied by a constant weight of 1 throughout the duration of the window. Samples occuring before or after the window are by definition given a weight of 0. Thus, such samples are in effect multiplied by the window. Although this approach is rather simple, it unfortunately results in substantial undesired side lobe response in the Fourier transform of the rectangular window as shown in FIG. 1. This undesired side lobe response corresponds to undesired filter responses in the filter stop-band. If such a filter were to be employed in a frequency detection scheme, it is likely that signals exhibiting frequencies other than the desired filter pass-band would pass through the digital filter at high enough levels to be falsely detected by threshold detection circuitry.

As discussed on pages 241–250 of the Oppenheim-Schafer text, other windows besides the aforementioned rectangular window may be employed to multiply or weight the signal samples thereby in the course of digital filtering to reduce the amplitude of the undesired side lobes. For example, the Bartlett, Hanning, Hamming, Blackman and Kaiser windows may be employed to weight sample values during such respective windows. Although each of these windows substantially reduces the amplitudes of undesired side lobe responses as compared to the main lobe response, implementation of such other nonrectangular windowing techniques consumes extremely large amounts of computational time when employed in a microprocessor, for example, as compared with the rectangular windowing technique. This is true because in the rectangular windowing technique, all samples which occur during the window are multiplied by 1 which is a simple computational task in binary processing. However, in the aforementioned non-rectangular windows, each of the signal samples is weighted by a different value having fractional values between 0 and 1 as is seen for example in the triangular Kaiser type window of FIG. 3. Weighting by such fractional values consumes large amounts of computational processing time.

It is one object of the present invention to attenuate the undesired stop-band response which corresponds to the side lobe response in the Fourier transform of the rectangular observation window.

It is another object of the present invention to more readily detect the presence of signal energy at or near a predetermined frequency.

Another object of the present invention is to detect the presence of a signal exhibiting a frequency within a selected pass-band without consuming large quantities of computational processing time.

These and other objects of the invention will become apparent to those skilled in the art upon consideration of the following description of the invention.

BRIEF SUMMARY OF THE INVENTION

The present invention is directed to providing a decoder circuit for detecting the presence of a signal exhibiting a predetermined frequency.

In accordance with one embodiment of the invention, a decoder circuit for detecting the presence of a signal exhibiting a predetermined frequency includes a timing circuit for generating observation interval signals. The decoder circuit further includes a sampling circuit, which is responsive to the timing circuit for sampling a first signal to produce samples thereof during a substantially rectangular observation interval. The sampling circuit includes apparatus for ignoring a portion of the samples occurring near the beginning or near the end of the observation interval. A correlation circuit is electrically coupled to the sampling circuit for correlating the samples with a predetermined pattern to detect the presence of a signal exhibiting the predetermined frequency within the first signal.

The features of the invention believed to be novel are set forth with particularity in the appended claims. The invention itself, however, both as to organization and method of operation, together with further objects and advantages thereof, may best be understood by reference to the following description taken in conjunction with the accompanying drawings.

DETAILED DESCRIPTION OF THE PREFERRED EMBODIMENT

Figure 4:
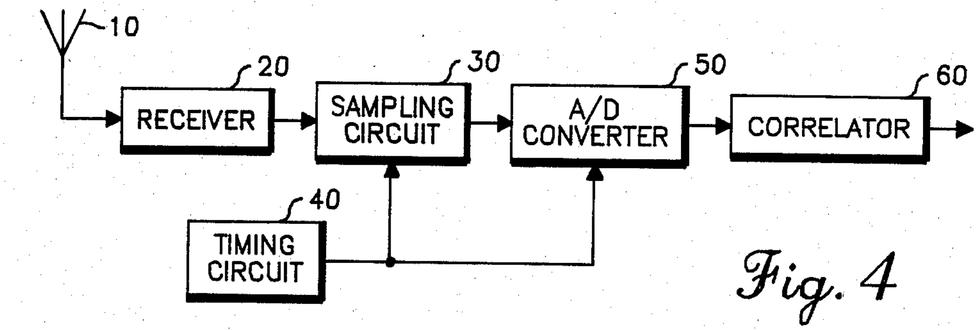
FIG. 4 is a block diagram of the decoding apparatus of the present invention.

FIG. 4 illustrates one embodiment of the present invention wherein the decoder of the present invention is advantageously employed to detect the presence of at least one tone signal superimposed or modulated on a radio frequency carrier wave, hereinafter referred to as the incoming signal. The incoming signal is captured by an antenna 10 and applied to the input of a receiver 20. Receiver 20 demodulates the incoming signal such that the radio frequency portion of the incoming signal is separated from the tone portion of the incoming signal which is provided to the output of receiver 20 and is hereinafter designated the received tone signal. The remaining circuitry of FIG. 4 subsequently described operates to detect the presence of received tone signals exhibiting a predetermined frequency, for example, 1,000 Hz.

Figure 5:
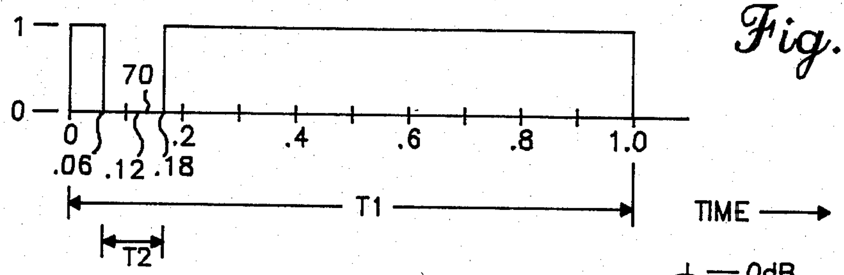
FIG. 5 is a amplitude vs. time graph of the observation window employed in the apparatus of the present invention.

The output of receiver 20 is coupled to the input of a sampling circuit 30 such that the received tone signal is applied to the input of sampling circuit 30. Sampling circuit 30 samples the received tone signal at a predetermined rate, for example, 10,989 Hz in this embodiment of the invention. A timing circuit 40 is coupled to sampling circuit 30 to cause sampling circuit 30 to conduct its sampling operation during the specially modified, substantially rectangular observation window (observation interval) depicted in FIG. 5. More specifically, the observation window of FIG. 5 determines which samples of the received tone signal occurring during the observation window will be provided to the output of sampling circuit 30. For purposes of discussion and graphic convenience, the observation window of FIG. 5 is "normalized" to have an overall duration T1 of 1 unit of time. However, in one embodiment of the invention, T1 equals 10 msec, for example.

Since sampling circuit 30 provides output to received tone signal samples during the observation interval defined in FIG. 5, sampling circuit 30 passes samples to its output during the T1 observation interval, except for a portion thereof defined as the "bite interval" 70 which in one embodiment of the invention exhibits a time duration of T2 (0.12 unit time) defined between 0.06 and 0.18 units of time of the T1 observation interval as shown in FIG. 5. Stated alternatively, during the substantially rectangular observation interval or window shown in FIG. 5, each sample taken by sampling circuit 30 during the observation interval occurring between the beginning of the observation interval and the beginning of bite interval 70 are, in effect, multiplied by or weighted 1. Thus, the samples just described are provided to the output of sampling circuit 30. However, those samples occurring during bite interval 70 are, in effect, multiplied by or weighted 0. It is seen that the plurality of signal samples occurring in succession during bite 70 are effectively dropped. Thus, in one embodiment, such samples do not reach the output of sampling circuit 30. As seen in FIG. 5, those samples occurring in the remaining portion of the observation interval after bite interval 70 are, in effect, multiplied by or weighted 1. Thus, such samples are provided output at the output of sampling circuit 30. The samples which thus reach the output of sampling circuit 30 are hereinafter referred to as "windowed samples".

The output of sampling circuit 30 is coupled to the input of an A/D converter 50. In one embodiment of the invention, the output of timing circuit 40 is operatively coupled to A/D converter 50. Converter 50 operates on the windowed samples to convert such samples from an analog to a digital format of 1, 0 or −1. A converter output signal of 1 corresponds to a converter input signal greater than zero. A converter output signal of −1 corresponds to a converter input signal of less than or equal to zero. A converter output of zero corresponds to a sample weighted zero.

The output of converter 50 is coupled to the input of a correlator 60. Correlator 60 operates on the windowed samples to determine if such samples result from a received tone signal exhibiting the predetermined frequency of 1,000 Hz, for example. One correlator which may be employed as correlator 60 is described and claimed in U.S. Pat. No. 4,302,817, issued to Gerald LaBedz, entitled "Psuedo-Continuous Tone Detector", and assigned to instant Assignee. U.S. Pat. No.

Figure 12:
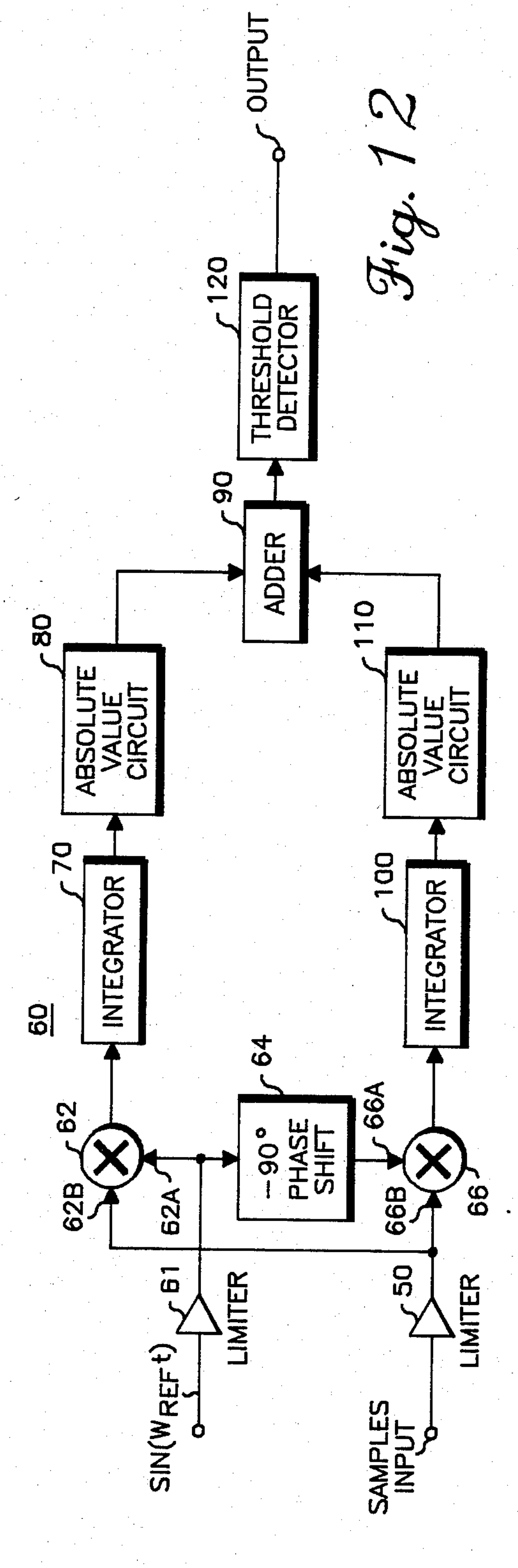
FIG. 12 is a block diagram of one correlator circuit which may be employed as the correlator shown in FIG. 4.

4,301,817 is incorporated herein by reference. Another correlator which may be employed as correlator 60 is shown in FIG. 12 and is described later.

Figure 1:
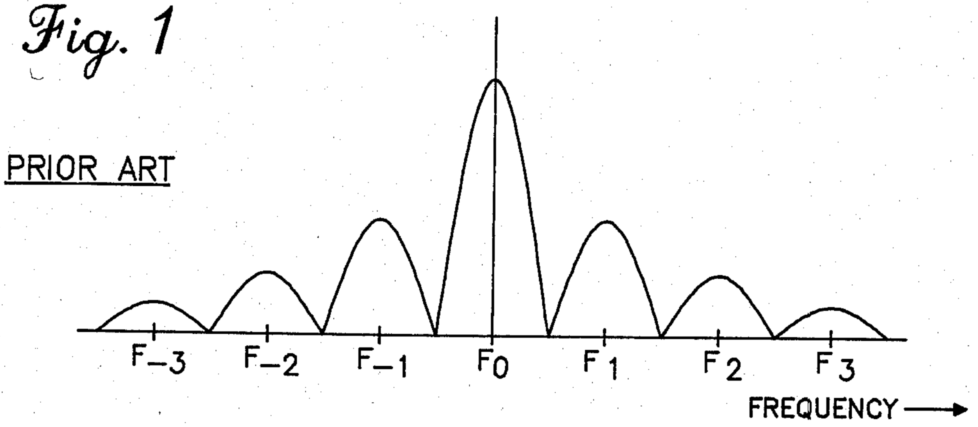
Fig. 1 PRIOR ART
FIG. 1 is a representation of the Fourier transform of a rectangular observation window.
Figure 2:
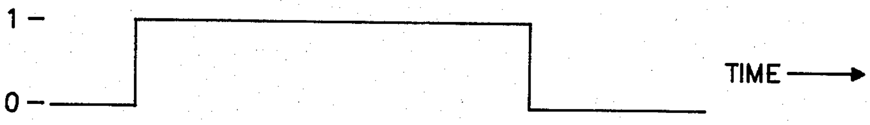
Fig. 2 PRIOR ART
FIG. 2 is a representation of a rectangular window.
Figure 6A:
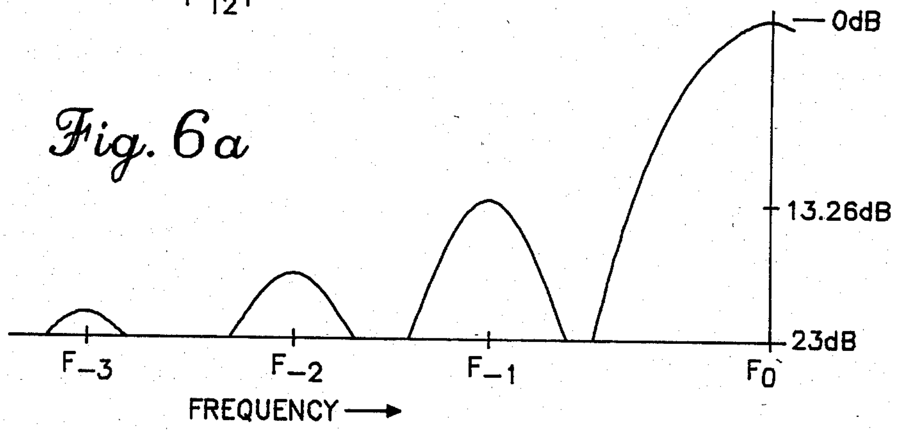
FIG. 6A is a representation of the main lobe response and side lobe response obtained when employing the aforementioned conventional rectangular windowing technique.

FIG. 6A is an amplitude versus frequency graph of the main lobe and side lobe response of conventional circuitry for detecting the presence of a tone signal which employs the rectangular observation window or interval of FIG. 2 to appropriately sample received tone signals. The main lobe response at frequency $F_0$ is normalized at 0 dB. It is observed that by employing the rectangular observation window of FIG. 2, a side lobe response is generated which follows a (sin x)/x function. For several frequency detection purposes, this relatively high side lobe response is unacceptable. More specifically, the response exhibited by the first side lobe at a frequency of $F_{-1}$ is $-13.26$ dB with respect to the main lobe response at a frequency $F_0$. Thus, due to the relatively high response exhibited at the first side lobe ($F_{-1}$) a decoder employing the rectangular window of FIG. 2 may tend to yield false indications that a desired signal exhibiting a frequency of $F_0$ is present when, in reality, a signal exhibiting a frequency of $F_{-1}$ is present. The side lobe response formed by the side lobes at frequencies of $F_{-2}$ and $F_{-3}$ is also shown in FIG. 6A.

Figure 6B:
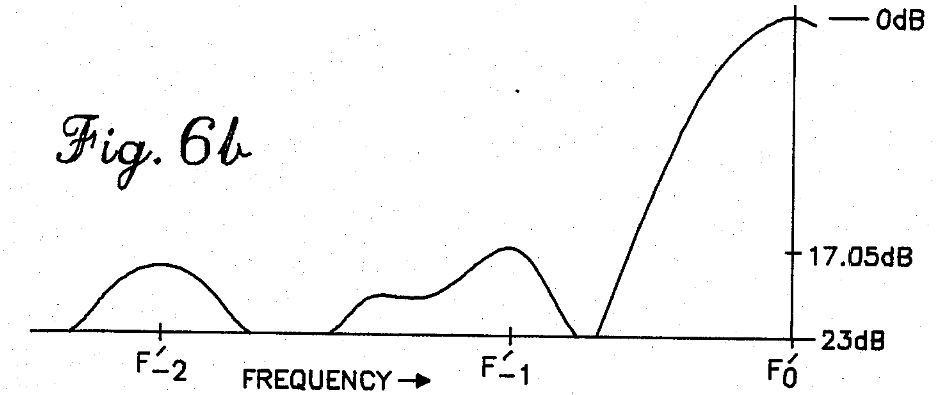
FIG. 6B is a representation of the main lobe response and improved side lobe response achieved by the present invention.

FIG. 6B illustrates the improved side lobe response achieved by the decoder apparatus of the present invention which employs the modified substantially rectangular observation interval of FIG. 5 to window the amplitude of 0 dB. First and second side lobes are shown at frequencies of $F_{-1}'$ and $F_{-2}'$, respectively. It is observed that in the response characteristics shown in FIG. 6B, the peak amplitude of the first side lobe at frequency $F_{-1}'$ is $-17.05$ dB. In comparison, the peak amplitude of the first side lobe ($F_{-1}$) for the response of FIG. 6A is $-13.26$ dB for the rectangular observation window. Thus, it is seen that the decoder apparatus of the present invention achieves an improvement of 3.79 dB in first side lobe response suppression as compared to techniques employing the rectangular observation window of FIG. 2.

The following Table 1 is a listing of the increases in dB's in the suppression of the first side lobe as a function of the time position of bite 70 (bite time position) within the T1 observation interval and as a function of the time duration of the bite (bite duration). Bite duration and bite time position are expressed as fractional portions of the T1 observation interval which is normalized to exhibit an overall duration of unit time 1. Various bite time positions are listed at the top of each column of dB suppression improvement values. Various values of bite duration are expressed as fractional portions of the T1 observation window at the beginning of each row of dB improvement of first side lobe suppression. Improvement in side lobe suppression may be determined from Table 1 by subtracting 13.26 dB from the dB levels indicated on the table.

TABLE 1 dB IMPROVEMENT

| | BITE POSITION → | | | | | | | | | | | | | | | | |
|---|---|---|---|---|---|---|---|---|---|---|---|---|---|---|---|---|---|
| BITE DURATION ↓ | .ØØØ | .Ø2Ø | .Ø4Ø | .Ø6Ø | .Ø8Ø | .1ØØ | .12Ø | .14Ø | .16Ø | .18Ø | .2ØØ | .22Ø | .24Ø | .26Ø | .28Ø | .3ØØ | .32Ø |
| Ø.ØØØ | 13.26 | 13.26 | 13.26 | 13.26 | 13.26 | 13.26 | 13.26 | 13.26 | 13.26 | 13.26 | 13.26 | 13.26 | 13.26 | 13.26 | 13.26 | 13.26 | 13.26 |
| Ø.Ø1Ø | 13.26 | 13.32 | 13.39 | 13.45 | 13.5Ø | 13.54 | 13.57 | 13.58 | 13.58 | 13.57 | 13.54 | 13.5Ø | 13.45 | 13.39 | 13.33 | 13.26 | 13.18 |
| Ø.Ø2Ø | 13.26 | 13.34 | 13.48 | 13.62 | 13.74 | 13.83 | 13.89 | 13.92 | 13.92 | 13.89 | 13.83 | 13.75 | 13.64 | 13.51 | 13.38 | 13.23 | 13.Ø9 |
| Ø.Ø3Ø | 13.26 | 13.32 | 13.55 | 13.76 | 13.95 | 14.12 | 14.22 | 14.28 | 14.28 | 14.23 | 14.13 | 13.98 | 13.81 | 13.61 | 13.4Ø | 13.18 | 12.97 |
| Ø.Ø4Ø | 13.26 | 13.26 | 13.58 | 13.89 | 14.16 | 14.4Ø | 14.57 | 14.65 | 14.66 | 14.58 | 14.43 | 14.21 | 13.96 | 13.68 | 13.39 | 13.1Ø | 12.82 |
| Ø.Ø5Ø | 13.26 | 13.26 | 13.56 | 13.96 | 14.35 | 14.68 | 14.92 | 15.Ø5 | 15.Ø6 | 14.94 | 14.72 | 14.43 | 14.1Ø | 13.74 | 13.37 | 13.ØØ | 12.66 |
| Ø.Ø6Ø | 13.26 | 13.26 | 13.51 | 14.Ø2 | 14.5Ø | 14.95 | 15.28 | 15.47 | 15.48 | 15.32 | 15.Ø2 | 14.65 | 14.22 | 13.77 | 13.32 | 12.89 | 12.48 |
| Ø.Ø7Ø | 13.26 | 13.26 | 13.41 | 14.ØØ | 14.62 | 15.19 | 15.65 | 15.91 | 15.92 | 15.7Ø | 15.32 | 14.85 | 14.27 | 13.78 | 13.25 | 12.75 | 12.28 |
| Ø.Ø8Ø | 13.26 | 13.26 | 13.26 | 13.95 | 14.68 | 15.41 | 16.Ø2 | 16.38 | 16.27 | 15.54 | 15.17 | 14.43 | 13.83 | 13.41 | 13.15 | 12.59 | 12.Ø8 |
| Ø.Ø9Ø | 13.26 | 13.26 | 13.26 | 13.84 | 14.68 | 15.57 | 16.37 | 16.74 | 15.84 | 15.12 | 14.75 | 14.Ø2 | 13.41 | 12.98 | 12.75 | 12.41 | 11.86 |
| Ø.1ØØ | 13.26 | 13.26 | 13.26 | 13.69 | 14.62 | 15.66 | 16.68 | 16.48 | 15.47 | 14.76 | 14.39 | 13.64 | 13.Ø2 | 12.59 | 12.35 | 12.21 | 11.62 |
| Ø.11Ø | 13.26 | 13.26 | 13.26 | 13.5Ø | 14.5Ø | 15.66 | 16.92 | 16.2Ø | 15.15 | 14.44 | 14.Ø8 | 13.28 | 12.65 | 12.22 | 11.98 | 11.92 | 11.38 |
| Ø.12Ø | 13.26 | 13.26 | 13.26 | 13.26 | 14.32 | 15.57 | 17.Ø5 | 15.91 | 14.88 | 14.18 | 13.75 | 12.93 | 12.31 | 11.88 | 11.65 | 11.58 | 11.13 |
| Ø.13Ø | 13.26 | 13.26 | 13.26 | 13.26 | 14.Ø9 | 15.38 | 16.96 | 15.67 | 14.65 | 13.97 | 13.42 | 12.61 | 11.99 | 11.57 | 11.33 | 11.27 | 1Ø.88 |
| Ø.14Ø | 13.26 | 13.26 | 13.26 | 13.26 | 13.83 | 15.13 | 16.62 | 15.49 | 14.47 | 13.81 | 13.11 | 12.31 | 11.7Ø | 11.28 | 11.Ø4 | 1Ø.99 | 1Ø.63 |
| Ø.15Ø | 13.26 | 13.26 | 13.26 | 13.26 | 13.55 | 14.82 | 16.17 | 15.34 | 14.35 | 13.69 | 12.83 | 12.Ø3 | 11.43 | 11.Ø2 | 1Ø.78 | 1Ø.73 | 1Ø.37 |
| Ø.16Ø | 13.26 | 13.26 | 13.26 | 13.26 | 13.26 | 14.5Ø | 15.72 | 15.25 | 14.27 | 13.54 | 12.57 | 11.79 | 11.19 | 1Ø.78 | 1Ø.55 | 1Ø.5Ø | 1Ø.12 |
| Ø.17Ø | 13.26 | 13.26 | 13.26 | 13.26 | 13.26 | 14.18 | 15.3Ø | 15.22 | 14.25 | 13.28 | 12.34 | 11.56 | 1Ø.97 | 1Ø.56 | 1Ø.33 | 1Ø.3Ø | 9.86 |
| Ø.18Ø | 13.26 | 13.26 | 13.26 | 13.26 | 13.26 | 13.86 | 14.91 | 14.96 | 14.Ø7 | 13.Ø4 | 12.12 | 11.36 | 1Ø.78 | 1Ø.37 | 1Ø.15 | 1Ø.11 | 9.6Ø |
| Ø.19Ø | 13.26 | 13.26 | 13.26 | 13.26 | 13.26 | 13.55 | 14.56 | 14.65 | 13.84 | 12.84 | 11.92 | 11.18 | 1Ø.6Ø | 1Ø.2Ø | 9.99 | 9.95 | 9.35 |
| Ø.2ØØ | 13.26 | 13.26 | 13.26 | 13.26 | 13.26 | 13.26 | 14.24 | 14.37 | 13.62 | 12.66 | 11.76 | 11.Ø2 | 1Ø.45 | 1Ø.Ø6 | 9.85 | 9.81 | 9.1Ø |
| Ø.21Ø | 13.26 | 13.26 | 13.26 | 13.26 | 13.26 | 13.26 | 13.95 | 14.13 | 13.43 | 12.49 | 11.61 | 1Ø.88 | 1Ø.32 | 9.94 | 9.73 | 9.57 | 8.85 |
| Ø.22Ø | 13.26 | 13.26 | 13.26 | 13.26 | 13.26 | 13.26 | 13.7Ø | 13.92 | 13.27 | 12.36 | 11.49 | 1Ø.77 | 1Ø.22 | 9.84 | 9.64 | 9.32 | 8.61 |
| Ø.23Ø | 13.26 | 13.26 | 13.26 | 13.26 | 13.26 | 13.26 | 13.47 | 13.73 | 13.14 | 12.25 | 11.4Ø | 1Ø.68 | 1Ø.14 | 9.77 | 9.56 | 9.Ø8 | 8.37 |
| Ø.24Ø | 13.26 | 13.26 | 13.26 | 13.26 | 13.26 | 13.26 | 13.26 | 13.58 | 13.Ø4 | 12.16 | 11.33 | 1Ø.62 | 1Ø.Ø8 | 9.71 | 9.52 | 8.84 | 8.13 |
| Ø.25Ø | 13.26 | 13.26 | 13.26 | 13.26 | 13.26 | 13.26 | 13.26 | 13.46 | 12.96 | 12.1Ø | 11.27 | 1Ø.58 | 1Ø.Ø5 | 9.68 | 9.35 | 8.6Ø | 7.9Ø |
| Ø.26Ø | 13.26 | 13.26 | 13.26 | 13.26 | 13.26 | 13.26 | 13.26 | 13.36 | 12.91 | 12.Ø7 | 11.25 | 1Ø.56 | 1Ø.Ø3 | 9.67 | 9.1Ø | 8.36 | 7.68 |
| Ø.27Ø | 13.26 | 13.26 | 13.26 | 13.26 | 13.26 | 13.26 | 13.26 | 13.3Ø | 12.89 | 12.Ø7 | 11.25 | 1Ø.56 | 1Ø.Ø4 | 9.56 | 8.85 | 8.13 | 7.46 |
| Ø.28Ø | 13.26 | 13.26 | 13.26 | 13.26 | 13.26 | 13.26 | 13.26 | 13.26 | 12.9Ø | 12.Ø9 | 11.27 | 1Ø.59 | 1Ø.Ø7 | 9.27 | 8.61 | 7.91 | 7.25 |
| Ø.29Ø | 13.26 | 13.26 | 13.26 | 13.26 | 13.26 | 13.26 | 13.26 | 13.26 | 12.94 | 12.14 | 11.32 | 1Ø.64 | 1Ø.13 | 8.99 | 8.37 | 7.69 | 7.Ø4 |
| Ø.3ØØ | 13.26 | 13.26 | 13.26 | 13.26 | 13.26 | 13.26 | 13.26 | 13.26 | 13.Ø2 | 12.21 | 11.4Ø | 1Ø.72 | 1Ø.21 | 8.7Ø | 8.13 | 7.47 | 6.83 |
| Ø.31Ø | 13.26 | 13.26 | 13.26 | 13.26 | 13.26 | 13.26 | 13.26 | 13.26 | 13.12 | 12.32 | 11.5Ø | 1Ø.83 | 1Ø.32 | 9.99 | 7.9Ø | 7.26 | 6.63 |
| Ø.32Ø | 13.26 | 13.26 | 13.26 | 13.26 | 13.26 | 13.26 | 13.26 | 13.26 | 13.26 | 12.45 | 11.63 | 1Ø.95 | 1Ø.46 | 1Ø.13 | 7.67 | 7.Ø5 | 6.44 |
| Ø.33Ø | 13.26 | 13.26 | 13.26 | 13.26 | 13.26 | 13.26 | 13.26 | 13.26 | 13.26 | 12INAREA | | | | | | 6.85 | 6.25 |
| | | | | | | | | | 11.78 | 11.11 | 1Ø.62 | 1Ø.3Ø | 7.45 | | | | |

samples taken of the received tone signal by sampling circuit 30. The main lobe response is centered about a frequency of 1,000 Hz $F_0'$ and exhibits a relative peak From Table 1, it is seen that the improvement in first side lobe suppression achieved by the decoder of the present invention varies with the position of the bite (bite time position) within the T1 observation interval and also with the duration of the bite. Depending on the bite time position and the bite duration of a particular bite in the T1 observation interval, increased side lobe suppression, decreased side lobe suppression or the same amount of side lobe response is achieved, as compared with decoders employing the completely rectangular observation window shown in FIG. 2. More specifically, referring directly to Table 1, it is seen, for example, that for a bite duration of 0.12 and a bite time position centered about 0.12 of the unit time 1 of the T1 time window, the peak amplitude of the first side lobe is 17.05 dB below the peak amplitude of the main response. It is recalled that prior decoder techniques employing a completely rectangular window typically result in a first side lobe exhibiting a peak amplitude of approximately −13.26 dB with respect to the main lobe response.

The aforementioned values for bite duration and bite time position are believed to be optimal for the decoder of the present invention. However, as seen from Table 1, a large range of bite durations and bite time positions near the beginning of the T1 observation interval result in an improvement in first side lobe suppression over the 13.26 dB suppression achieved by prior decoders employing rectangular observation windows. Improved values of first side lobe suppression are noted within the solid line forming an irregularly shaped box within Table 1. The corresponding bite durations and bite time positions which cause a particular improved side lobe suppression value within the box are readily determined by selecting a particular value of side lobe suppression and reading horizontally over to the corresponding bite duration and vertically upward to the corresponding bite time position.

It is noted that first side lobe suppression values outside of the box either represent no improvement in side lobe suppression or a decrease in first side lobe suppression. For example, a bite duration of 0.33 T1 together with a bite time position of 0.1 T1 yield a first side lobe with a peak amplitude of 13.26 dB. This represents no improvement over the rectangular observation window of conventional decoders. Also by way of example, a bite duration of 0.33 T1 and a bite time position centered about 0.32 of the T1 normalized observation interval yield a first side lobe having a peak amplitude of 6.2 dB which is larger and thus less desirable than the first side lobe response achieved by conventional decoders employing a completely rectangular observation window. It is thus seen that it is important to select bite duration and bite time position values corresponding to side lobe suppression values within the box of Table 1 in order to achieve significant amounts of side lobe suppression consistent with the present invention.

Figure 7:
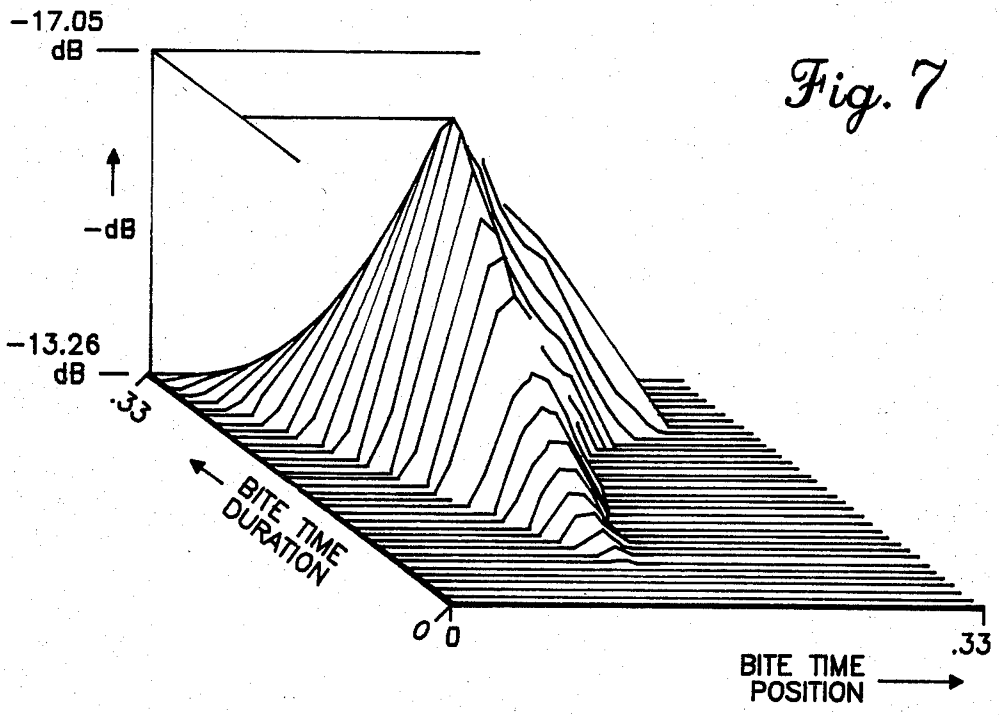
FIG. 7 is a graphical representation illustrating the amount of improvement in side lobe suppression measured in dB achieved by the present invention as the width of the bite (bite duration) in the observation window of FIG. 5 is varied and as the position of the bite (bite duration) is varied within such observation window.

FIG. 7 is a three-dimensional representation of increase of first side lobe suppression achieved by the decoder of the present invention as a function of bite duration and bite time position within the normalized T1 observation iterval. In this representation, the bite time position is shown between 0.0 T1 and 0.33 T1. For convenience, when plotting the graph of FIG. 7 from the values shown in Table 1, the representation of FIG. 7 concentrates on the values of bite duration and bite time position which result in increases in first side lobe suppression. This is accomplished by portraying all values of side lobe suppression which are not increases of side lobe suppression as a flat plane having a value of 13.26 dB. From FIG. 7, it will be appreciated that certain values of bite duration and a bite time position are more optimal than others in terms of maximizing first side lobe suppression.

Figure 8:
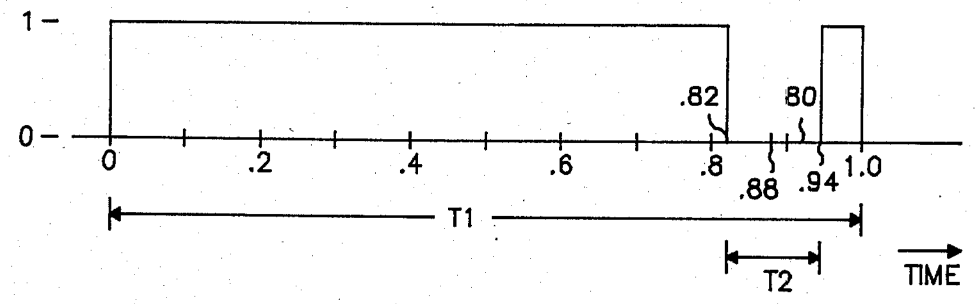
FIG. 8 is an amplitude vs. time graph of an alternative observation window which may be employed in the present invention.

FIG. 8 is a representation of an alternative modified rectangular observation window employed in the decoder apparatus of the present invention. FIG. 8 is substantially similar to the observation window of FIG. 5 except that the bite during which sampling circuit 30 is inhibited is now, by symmetry, situated near the end of the T1 time interval instead of near the beginning of the T1 time interval. The bite shown in FIG. 8 is designated bite 80. In an alternative embodiment of decoder apparatus of the present invention, the bite is situated in the manner shown in FIG. 8 for bite 80 as opposed to the manner shown in FIG. 5 for bite 70.

Bite 80 is optimally centered approximately at 0.88 T1 in the T1 observation interval which exhibits a total unit time of 1. The optimal time duration or bite duration T2 for bite 80 is 0.12 T1 as shown in FIG. 8. Thus, when the observation interval or observation window shown in FIG. 8 is employed in the decoding apparatus of the present invention, samples taken by sampling circuit 30 from the beginning of the T1 time interval until the beginning of bite 80 are, in effect, multiplied by or weighted by the quantity 1. Samples occurring during bite 80 are weighted or multiplied by 0. Thus, the plurality of samples occurring in succession during bite 80 are effectively dropped. Samples occurring after the end of bite 80 and before the end of the T1 observation interval are weighted or multiplied by 1. Such weighting of samples is implemented for each observation window which is imposed upon the incoming samples of the received tone signal.

The following Table 2 is a table substantially similar to Table 1, except bite time positions between 0.66 and 1 of the T1 observation interval are used. Thus, Table 2 shows the various amounts of first side lobe suppression improvements (in dB) which occur for bite durations between 0.0 T1 and 0.33 T1 and for bite positions between 0.66 T1 and 1.0 T1 of the T1 time interval. In a manner similar to Table 1, a solid line is drawn around all values which represents an improvement in first side lobe suppression to form an irregularly shaped box within Table 2. Each first side lobe suppression value within the box corresponds to a particular bite duration and bite time position. Improvement in side lobe suppression may be determined from Table 2 in the same manner as Table 1, that is, by subtracting 13.26 dB from the dB levels indicated on the table.

TABLE 2 dB IMPROVEMENT

BITE POSITION ⟶

| .66Ø | .68Ø | .7ØØ | .72Ø | .74Ø | .76Ø | .78Ø | .8ØØ | .82Ø | .84Ø | .86Ø | .88Ø | .9ØØ | .92Ø | .94Ø | .96Ø | .98Ø |
|---|---|---|---|---|---|---|---|---|---|---|---|---|---|---|---|---|

TABLE 2-continued

| | | dB IMPROVEMENT | | | | | | | | | | | | | | | | |
|---|---|---|---|---|---|---|---|---|---|---|---|---|---|---|---|---|---|---|
| | 0.000 | 13.26 | 13.26 | 13.26 | 13.26 | 13.26 | 13.26 | 13.26 | 13.26 | 13.26 | 13.26 | 13.26 | 13.26 | 13.26 | 13.26 | 13.26 | 13.26 | 13.26 |
| | 0.010 | 13.11 | 13.18 | 13.26 | 13.33 | 13.39 | 13.45 | 13.50 | 13.54 | 13.57 | 13.58 | 13.58 | 13.57 | 13.54 | 13.50 | 13.45 | 13.39 | 13.32 |
| | 0.020 | 12.95 | 13.09 | 13.23 | 13.38 | 13.51 | 13.64 | 13.75 | 13.83 | 13.89 | 13.92 | 13.92 | 13.89 | 13.83 | 13.74 | 13.62 | 13.48 | 13.34 |
| | 0.030 | 12.77 | 12.97 | 13.18 | 13.40 | 13.61 | 13.81 | 13.98 | 14.13 | 14.23 | 14.28 | 14.28 | 14.22 | 14.12 | 13.95 | 13.76 | 13.55 | 13.32 |
| | 0.040 | 12.56 | 12.82 | 13.10 | 13.39 | 13.68 | 13.96 | 14.21 | 14.43 | 14.58 | 14.66 | 14.65 | 14.57 | 14.40 | 14.16 | 13.89 | 13.58 | 13.26 |
| | 0.050 | 12.34 | 12.66 | 13.00 | 13.37 | 13.74 | 14.10 | 14.43 | 14.72 | 14.94 | 15.06 | 15.05 | 14.92 | 14.68 | 14.35 | 13.96 | 13.56 | 13.26 |
| | 0.060 | 12.10 | 12.48 | 12.89 | 13.32 | 13.77 | 14.22 | 14.65 | 15.02 | 15.32 | 15.48 | 15.47 | 15.28 | 14.95 | 14.50 | 14.02 | 13.51 | 13.26 |
| | 0.070 | 11.86 | 12.28 | 12.75 | 13.25 | 13.78 | 14.27 | 14.85 | 15.32 | 15.70 | 15.92 | 15.91 | 15.65 | 15.19 | 14.62 | 14.00 | 13.41 | 13.26 |
| | 0.080 | 11.61 | 12.08 | 12.59 | 13.15 | 13.41 | 13.83 | 14.43 | 15.17 | 15.54 | 16.27 | 16.38 | 16.02 | 15.41 | 14.68 | 13.95 | 13.26 | 13.26 |
| | 0.090 | 11.36 | 11.86 | 12.41 | 12.75 | 12.98 | 13.41 | 14.02 | 14.75 | 15.12 | 15.84 | 16.74 | 16.37 | 15.57 | 14.68 | 13.84 | 13.26 | 13.26 |
| | 0.100 | 11.10 | 11.62 | 12.21 | 12.35 | 12.59 | 13.02 | 13.64 | 14.39 | 14.76 | 15.47 | 16.48 | 16.68 | 15.66 | 14.62 | 13.69 | 13.26 | 13.26 |
| | 0.110 | 10.83 | 11.38 | 11.92 | 11.98 | 12.22 | 12.65 | 13.28 | 14.08 | 14.44 | 15.15 | 16.20 | 16.92 | 15.66 | 14.50 | 13.50 | 13.26 | 13.26 |
| | 0.120 | 10.56 | 11.13 | 11.58 | 11.65 | 11.88 | 12.31 | 12.93 | 13.75 | 14.18 | 14.88 | 15.91 | 17.05 | 15.57 | 14.32 | 13.26 | 13.26 | 13.26 |
| | 0.130 | 10.29 | 10.88 | 11.27 | 11.33 | 11.57 | 11.99 | 12.61 | 13.42 | 13.97 | 14.65 | 15.67 | 16.96 | 15.38 | 14.09 | 13.26 | 13.26 | 13.26 |
| | 0.140 | 10.02 | 10.63 | 10.99 | 11.04 | 11.28 | 11.70 | 12.31 | 13.11 | 13.81 | 14.47 | 15.49 | 16.62 | 15.13 | 13.83 | 13.26 | 13.26 | 13.26 |
| B | 0.150 | 9.75 | 10.37 | 10.73 | 10.78 | 11.02 | 11.43 | 12.03 | 12.83 | 13.69 | 14.35 | 15.34 | 16.17 | 14.82 | 13.55 | 13.26 | 13.26 | 13.26 |
| I | 0.160 | 9.49 | 10.12 | 10.50 | 10.55 | 10.78 | 11.19 | 11.79 | 12.57 | 13.54 | 14.27 | 15.25 | 15.72 | 14.50 | 13.27 | 13.26 | 13.26 | 13.26 |
| T | 0.170 | 9.23 | 9.86 | 10.30 | 10.33 | 10.56 | 10.97 | 11.56 | 12.34 | 13.28 | 14.25 | 15.22 | 15.30 | 14.18 | 13.26 | 13.26 | 13.26 | 13.26 |
| E | 0.180 | 8.97 | 9.68 | 10.11 | 10.15 | 10.37 | 10.78 | 11.36 | 12.12 | 13.04 | 14.07 | 14.96 | 14.91 | 13.86 | 13.26 | 13.26 | 13.26 | 13.26 |
| | 0.190 | 8.72 | 9.35 | 9.95 | 9.99 | 10.20 | 10.60 | 11.18 | 11.92 | 12.84 | 13.84 | 14.65 | 14.56 | 13.55 | 13.26 | 13.26 | 13.26 | 13.26 |
| | 0.200 | 8.47 | 9.10 | 9.81 | 9.85 | 10.06 | 10.45 | 11.02 | 11.76 | 12.66 | 13.62 | 14.27 | 14.24 | 13.26 | 13.26 | 13.26 | 13.26 | 13.26 |
| D | 0.210 | 8.22 | 8.85 | 9.57 | 9.73 | 9.94 | 10.32 | 10.88 | 11.61 | 12.49 | 13.43 | 14.13 | 13.95 | 13.26 | 13.26 | 13.26 | 13.26 | 13.26 |
| U | 0.220 | 7.98 | 8.61 | 9.32 | 9.64 | 9.84 | 10.22 | 10.77 | 11.49 | 12.36 | 13.27 | 13.92 | 13.70 | 13.26 | 13.26 | 13.26 | 13.26 | 13.26 |
| R | 0.230 | 7.74 | 8.37 | 9.08 | 9.56 | 9.77 | 10.14 | 10.68 | 11.40 | 12.25 | 13.14 | 13.73 | 13.47 | 13.26 | 13.26 | 13.26 | 13.26 | 13.26 |
| A | 0.240 | 7.51 | 8.13 | 8.84 | 9.52 | 9.71 | 10.08 | 10.62 | 11.33 | 12.16 | 13.04 | 13.58 | 13.26 | 13.26 | 13.26 | 13.26 | 13.26 | 13.26 |
| T | 0.250 | 7.29 | 7.90 | 8.60 | 9.35 | 9.68 | 10.05 | 10.58 | 11.27 | 12.10 | 12.96 | 13.46 | 13.26 | 13.26 | 13.26 | 13.26 | 13.26 | 13.26 |
| I | 0.260 | 7.07 | 7.68 | 8.36 | 9.10 | 9.67 | 10.03 | 10.56 | 11.25 | 12.07 | 12.91 | 13.36 | 13.26 | 13.26 | 13.26 | 13.26 | 13.26 | 13.26 |
| O | 0.270 | 6.86 | 7.46 | 8.13 | 8.85 | 9.56 | 10.04 | 10.56 | 11.25 | 12.07 | 12.89 | 13.30 | 13.26 | 13.26 | 13.26 | 13.26 | 13.26 | 13.26 |
| N | 0.280 | 6.65 | 7.25 | 7.91 | 8.61 | 9.27 | 10.07 | 10.59 | 11.27 | 12.09 | 12.94 | 13.27 | 13.26 | 13.26 | 13.26 | 13.26 | 13.26 | 13.26 |
| ↓ | 0.290 | 6.45 | 7.04 | 7.69 | 8.37 | 8.99 | 10.13 | 10.64 | 11.32 | 12.14 | 12.94 | 13.26 | 13.26 | 13.26 | 13.26 | 13.26 | 13.26 | 13.26 |
| | 0.300 | 6.25 | 6.83 | 7.47 | 8.13 | 8.70 | 10.21 | 10.72 | 11.40 | 12.21 | 13.02 | 13.26 | 13.26 | 13.26 | 13.26 | 13.26 | 13.26 | 13.26 |
| | 0.310 | 6.06 | 6.63 | 7.26 | 7.90 | 9.99 | 10.32 | 10.83 | 11.50 | 12.32 | 13.12 | 13.26 | 13.26 | 13.26 | 13.26 | 13.26 | 13.26 | 13.26 |
| | 0.320 | 5.88 | 6.44 | 7.05 | 7.67 | 10.13 | 10.46 | 10.95 | 11.63 | 12.45 | 13.26 | 13.26 | 13.26 | 13.26 | 13.26 | 13.26 | 13.26 | 13.26 |
| | 0.330 | 5.70 | 6.25 | 6.85 | 7.45 | 10.30 | 10.62 | 11.11 | 11.78 | 12.61 | 13.26 | 13.26 | 13.26 | 13.26 | 13.26 | 13.26 | 13.26 | 13.26 |

Figure 9:
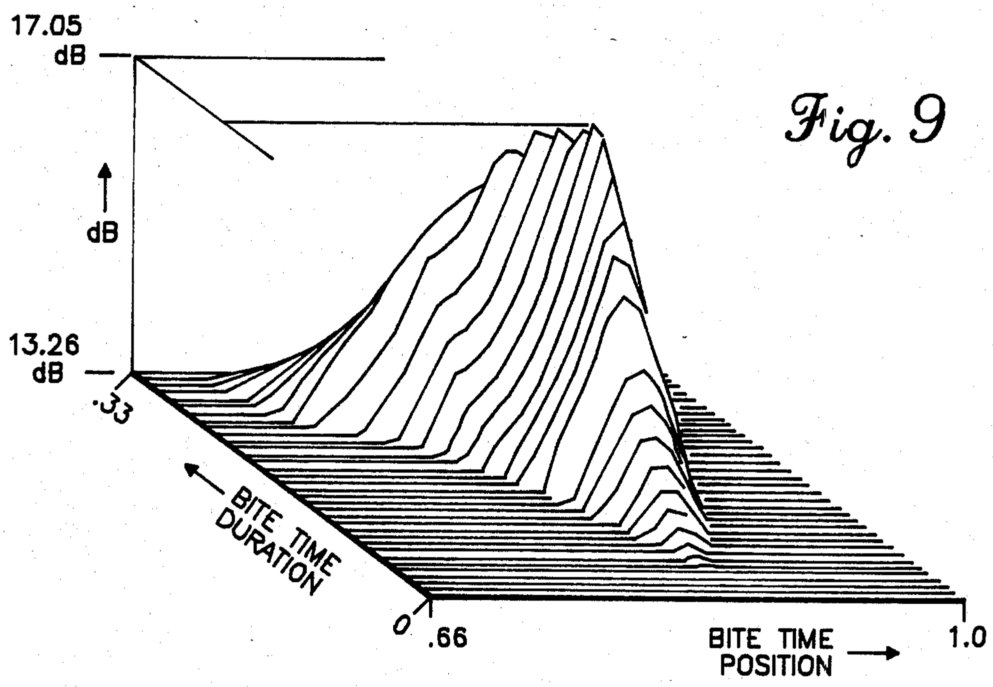
FIG. 9 is a graphical representation of the amount of improvement in side lobe suppression measured in dB achieved by employing the window of FIG. 8 as a function of the width and the position of the bite in the observation window.

FIG. 9 is a three-dimensional representation of the improvement in first side lobe suppression as a function of bite duration and bite time position. More specifically, the representation of FIG. 9 is a plot of the side lobe suppression values of Table 2 as a function of bite duration and bite time position during the 0.66 T1 to 1.0 T1 portion of the T1 observation interval. It is seen that a relatively large number of bite durations and bite time positions will result in the improvements in the suppression of the first side lobe response.

Figure 10:
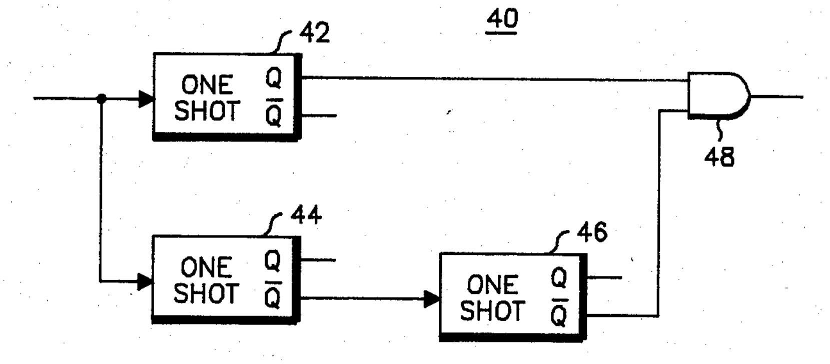
FIG. 10 is a block diagram of one timing circuit which may be employed as the timing circuit shown in the apparatus of FIG. 4.

FIG. 10 is a schematic diagram of one timing circuit which may be employed as timing circuit 40 of FIG. 4. Timing circuit 40 generates the substantially rectangular observation interval or observation window shown in FIG. 8 including bite 80 therein centered about 0.88 T1 of the T1 time interval. Assuming that bite 80 exhibits a bite duration of 0.12 of the unit time 1, bite 80 commences at 0.82 T1 and ceases at 0.94 T1 of the T1 interval as shown in FIG. 8. As shown in FIG. 10, timing circuit 40 includes a one shot monostable multivibrator 42 having an input forming the overall input of timing circuit 40 so as to receive the timing initialization pulse shown in the timing diagram FIG. 11A which commences an observation window. Multivibrator 42 is configured to exhibit an on time equal to that of the observation interval T1. Thus, when the initialization pulse shown in the timing diagram of FIG. 11A is applied to the input of multivibrator 42, multivibrator 42 turns on and stays on for the entirety of the T1 time interval, that is for one unit of time as shown in the timing diagram of FIG. 11B.

Figures 11A, 11B, 11C, 11D, 11E, 11F, 11G:
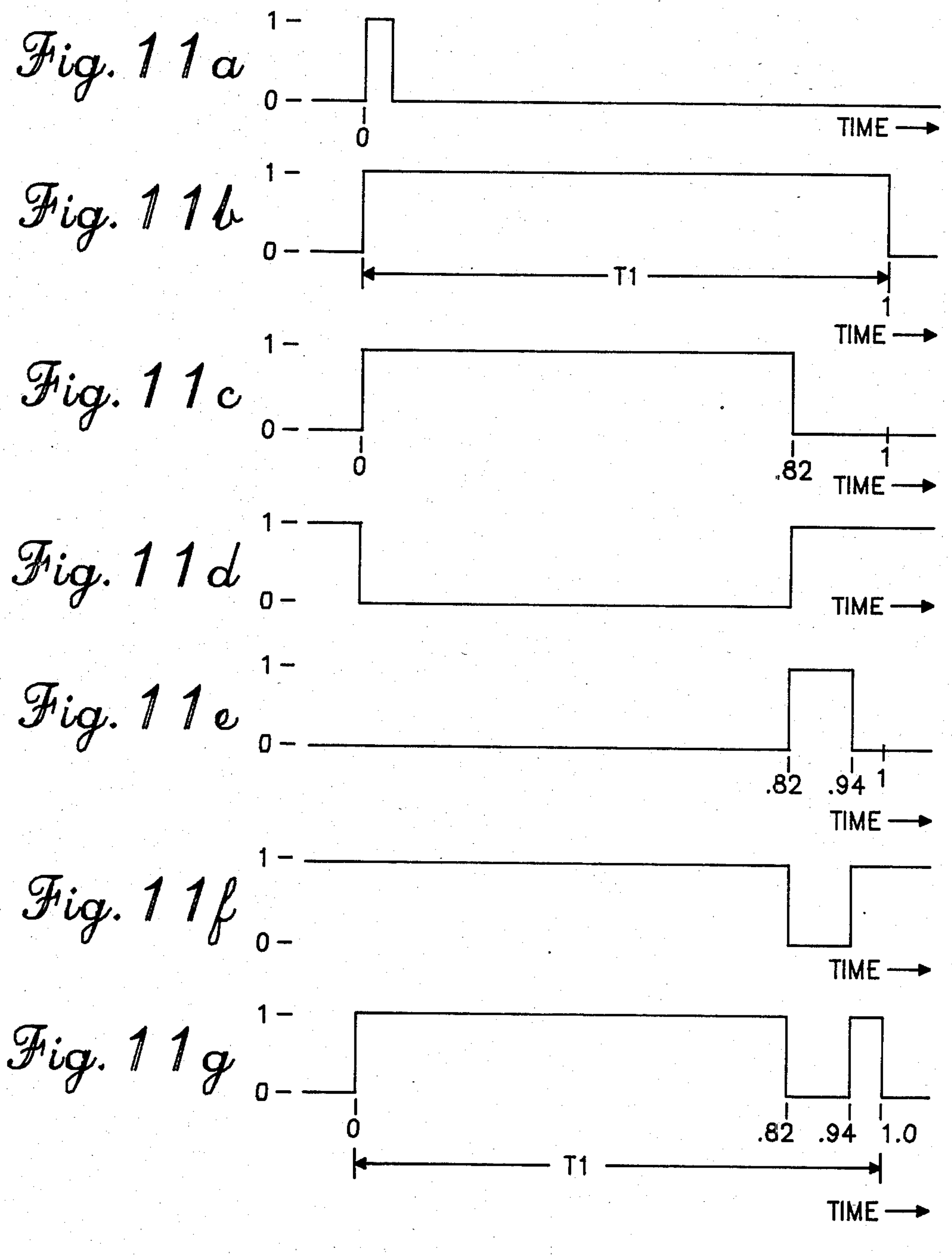
FIGS 11A–11G are the timing diagrams illustrating the signal waveforms of various test points in the timing circuit of FIG. 8.

The input of multivibrator 42 is coupled to the input of a one shot monostable multivibrator 44 which transitions from the zero logic state to the one logic state whenever the initialization pulse of FIG. 11A is applied thereto. Multivibrator 44 then returns to the zero logic state after 0.82 of the T1 unit time interval has elapsed as seen in FIG. 11C which shows the Q output wave form of multivibrator 44. The $\overline{Q}$ output of multivibrator 44 is coupled to the input of a one shot monostable multivibrator 46 such that the waveform shown in FIG. 11D is provided thereto. It is noted that the waveform of 11D is the inverse of the waveform of 11C. Multivibrator 46 is configured to transition from a logical zero output state to a logical one output state at the Q output thereof whenever a positive going transition is provided to the input thereof. Thus, when the positive going transition of the FIG. 11D waveform at 0.82 of the T1 time interval is provided to the input of multivibrator 46, multivibrator 46 transitions from a logical zero to a logical one for a duration of 0.12 of the T1 time interval as shown in FIG. 11E. After 0.12 of the T1 time interval has elapsed, the Q output of multivibrator 46 transitions from a logical one to a logical zero as shown in the waveform of FIG. 11E. FIG. 11F shows the waveform at the $\overline{Q}$ output of multivibrator 46. It is noted that the waveform of FIG. 11F is the inverse of the waveform of 11E.

The Q output of multivibrator 42 and the $\overline{Q}$ output of multivibrator 46 are coupled to the respective inputs of a two input AND gate 48. Thus, the waveform of FIG. 11B and the waveform of FIG. 11F are AND'ed together by AND gate 48 such that the waveform shown in FIG. 11G is generated at the output of AND gate 48. The waveform of FIG. 11G corresponds to one modified substantially rectangular observation interval or window which is employed to control sampling circuit 30 of FIG. 4. The specific connections of timing circuit 40 as shown in FIG. 10 to the remaining portions of the circuitry of the present invention in order to achieve windowing of the samples of the received signals in accordance with the present invention will be discussed in more detail subsequently.

Figure 3:
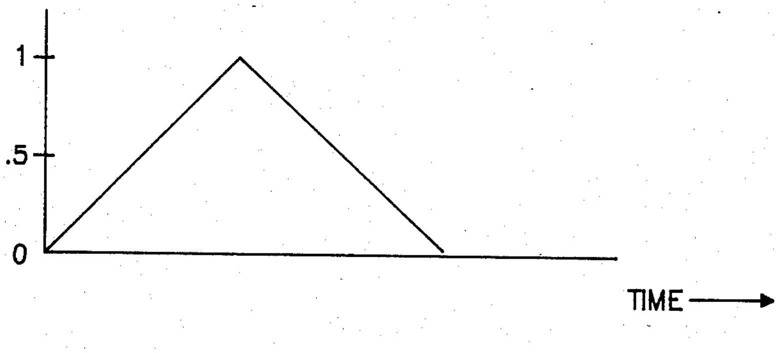
Fig. 3 PRIOR ART
FIG. 3 is a representation of a non-rectangular, triangular type Kaiser window.

One correlator which may be employed as correlator 60 of FIG. 4 is the correlator shown in FIG. 12. The correlator of FIG. 12 is shown in FIG. 3 of U.S. Pat. No. 4,216,463 entitled Programmable Digital Tone Detector issued to Backof, Jr. et al. and assigned to the instant Assignee. U.S. Pat. No. 4,216,463 is incorporated herein by reference. Such correlator is now described briefly in the discussion of FIG. 12.

A sine wave reference signal sin($w_{REF}t$) is applied via a limiter circuit 61 to one input 62A of a two input multiplier circuit 62, the remaining input of which is designated 62B. Mixer input 62A is coupled via a minus 90° phase shift network 64 to one input 66A of a two input multiplier circuit 66, the remaining input of which is designated 66B. Thus, while a sine wave reference signal is applied to multiplier input 62A, a cosine wave reference signal is applied to multiplier input 66A due to the phase shift action of circuit 64. The samples of the received signal generated by sampling circuit 30 of FIG. 4 are provided to multiplier inputs 62B and 66B via a limiting circuit 50 coupled between sampling circuit output 30 and multiplier inputs 62B and 66B. It is noted that although in the representation of FIG. 4 timing circuit 40 is shown coupled to sampling circuit 30, timing circuit 40 is shown operatively coupled to converter circuit 50 as well, in a manner so as to appropriately permit samples weighted by a factor of 1 to be supplied to correlator 60 during all portions of the T1 observation interval except for the T2 bite portion thereof during which samples weighted zero are supplied to correlator 60.

Each of the samples reaching multiplier input 62B are multiplied by the sine wave reference signal at multiplier input 62A. The resultant of such multiplication appears at the output of multiplier 62 which is coupled to the input of an integrator 70. Integrator circuit 70 integrates the multiplied samples supplied thereto so as to generate the intergral of the multiplied samples at the output thereof. The output of integrator 70 is coupled to an absolute value circuit 80 which generates the absolute value of the integrated multiplied samples and provides the same to one input of a two-input adder circuit 90.

The samples applied to multiplier circuit input 66B are multiplied by the cosine wave reference signal supplied to multiplier input 66A such that the resultant of these two signals is provided to the output of multiplier 66 which is coupled to the input of an integrator circuit 100. Integrator circuit 100 integrates the multiplied samples provided thereto to generate the integral of such multiplied samples at the output thereof. The output of integrator circuit 100 is coupled to the input of an absolute value circuit 110 which generates the absolute value of the integral of the multiplied samples at the output thereof. The output of absolute value circuit 110 is coupled to the remaining input of adder circuit 90. Thus, a signal representing the summation of the absolute value of the integral of received signal samples multiplied by the sine wave reference waveform at multiplier input 62A and the absolute value of the integral of the samples of the received signal multiplied by the cosine reference waveform at multiplier input 66A is generated at the output of adder circuit 90.

The output of adder circuit 90 is coupled to a threshold detector 120. Whenever the input of threshold detector 120 exceeds a predetermined value, detector 120 generates an output signal which indicates that a predetermined degree of correlation has occurred. More specifically, when this occurs, correlator 60 has determined that the tone signal received by receiver 20 and sampled by sampler circuit 30 exhibits a frequency approximately equal to the frequency of the sine wave reference waveform supplied to multiplier input 62A of correlator 60. In the foregoing example, correlator 60 was configured to detect the presence of a 1000 Hz received signal. Thus, the sine wave reference waveform supplied to multiplier input 62A equals 1000 Hz in this example. However, it is understood that the presence of other received tone signals may be detected as well, for example, received tone signals exhibiting frequencies of 1500 Hz and 2000 Hz providing that sine wave reference waveforms exhibiting such alternative frequencies are supplied to the input of limiter 61. The circuit of the present invention will operate to reduce the amplitude of the first side lobe for these received tone signals as well, thus permitting the threshold of threshold detector 120 to be set at relatively lower levels resulting in an increase in the probability of tone signal detection. Alternatively, the threshold of threshold detector 120 is not changed to the aforementioned relatively lower level. In such case, the result is a corresponding decrease in the probability of detector 120 responding to tone signals occurring at frequencies corresponding to the first side lobe response.

Figure 13:
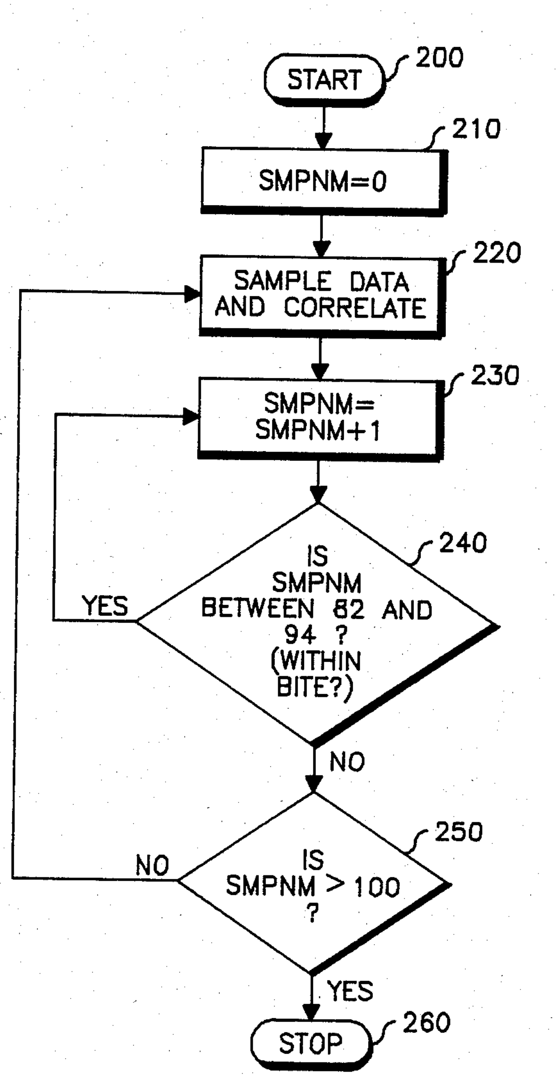
FIG. 13 is a flow chart which summarizes the steps in the operation of the present invention.

FIG. 13 is a flow chart describing the operation of the apparatus of the present invention when the T1 observation interval shown in FIG. 8 is employed therein. It is recalled that in accordance with the invention, during such T1 observation interval or observation window, samples of the received tone signal are taken, weighted by a factor of one, and correlated until the time 0.82 T1 is reached. At such time bite 80 commences during which samples of the received signals are weighted zero or otherwise suppressed or inhibited for the duration of the bite which exists from a time equal to 0.82 T1 and 0.94 T1. At the end of bite 80, namely at 0.94 T1 sampling of the received tone signal continues and weighting of such samples of the received signal by a factor of 1 continues along with correlation thereof until the end of T1 time interval. The flow chart of FIG. 13 illustrates this operation of the invention.

More specifically, the flow chart of FIG. 13 commences with a START statement 200 followed by statement 210 which sets SMPNM equal to zero. SMPNM is a counter representing the number accorded to a particular sample of the received tone signal. After executing block 210, data is sampled and correlated in accordance with block 220. After executing block 220, the counter SMPNM is incremented by 1 such that the apparatus of the invention proceeds to the next (in this case the first) sample in accordance with block 230. After incrementing in accordance with block 230, a decision block 240 is provided which determines whether a particular sample occurs during the bite 80 of the T1 time interval, that is between a time equal to 0.82 T1 and 0.94 T1. If SMPNM is between 0.82 T1 and 0.94 T1 (which corresponds to being between 82 and 94 in the flow chart of FIG. 13), then the decision block 240 causes operation to return to block 230 where SMPNM is incremented 8, designated PA3 is coupled to the output of squelch circuit 330.

Terminals 40 (VDD), 22 (PC6), 23 (PC5) and 24 (PC4) are coupled together and to pins 12 (RESET) and 14 (VCC) of read only memory 350 and to a source of appropriate operating voltage designated B+. One read only memory which may be employed as read only memory 350 is the Motorola EEPROM MCM2802P. Pins 4 (VPP), 3 (T1), 5 (S4), 7 (VSS), 8 (S3), 9 (S2), 10 (S1) and 13 (T2) of read only memory 350 are coupled together and to ground and to microcomputer pins 20 (VSS), 37 (TIMER) and 3 (NUM). Microcomputer pins 7 (PA4), 14 (PB2) and 21 (PC7) are coupled to each other and to ground. In this embodiment of the invention, microprocessor 330 is appropriately clocked at a 1 MHz bus frequency.

Table 3 is a hexidecimal core dump of the contents of microprocessor 330. Table 4 is a hexidecimal dump of the contents of read only memory of code plug 350. When microcomputer 330 and read only memory 350 are appropriately programmed by reading the contents of Tables 3 and 4 therein, respectively, microcomputer 330 together with read only memory 350 and the remaining portions of the circuit shown in FIG. 15 cooperate to implement one embodiment of the present invention. Tables 3 and 4 follow.

TABLE 3

| | | | | | | | | | | | | | | | | |
|---|---|---|---|---|---|---|---|---|---|---|---|---|---|---|---|---|
| 0000 | 00 | 00 | 00 | 00 | 00 | 00 | 00 | 00 | 00 | 00 | 00 | 00 | 00 | 00 | 00 | 00 |
| 0010 | 00 | 00 | 00 | 00 | 00 | 00 | 00 | 00 | 00 | 00 | 00 | 00 | 00 | 00 | 00 | 00 |
| 0020 | 00 | 00 | 00 | 00 | 00 | 00 | 00 | 00 | 00 | 00 | 00 | 00 | 00 | 00 | 00 | 00 |
| 0030 | 00 | 00 | 00 | 00 | 00 | 00 | 00 | 00 | 00 | 00 | 00 | 00 | 00 | 00 | 00 | 00 |
| 0040 | 00 | 00 | 00 | 00 | 00 | 00 | 00 | 00 | 00 | 00 | 00 | 00 | 00 | 00 | 00 | 00 |
| 0050 | 00 | 00 | 00 | 00 | 00 | 00 | 00 | 00 | 00 | 00 | 00 | 00 | 00 | 00 | 00 | 00 |
| 0060 | 00 | 00 | 00 | 00 | 00 | 00 | 00 | 00 | 00 | 00 | 00 | 00 | 00 | 00 | 00 | 00 |
| 0070 | 00 | 00 | 00 | 00 | 00 | 00 | 00 | 00 | 00 | 00 | 00 | 00 | 00 | 00 | 00 | 00 |
| 0080 | 24 | 04 | 16 | 01 | 20 | 02 | 17 | 01 | 18 | 01 | 19 | 01 | 81 | A6 | 60 | B7 |
| 0090 | 09 | A6 | 21 | B7 | 04 | AE | 10 | A6 | 14 | B7 | 3B | A6 | 0A | B7 | 3D | CD |
| 00A0 | 00 | ED | 3A | 3D | 26 | F9 | B6 | 10 | 26 | 04 | 9C | CC | 06 | 42 | 81 | B7 |
| 00B0 | 3B | A6 | 4E | B7 | 3A | 20 | 06 | B7 | 3B | A6 | 46 | B7 | 3A | A6 | 08 | B7 |
| 00C0 | 3C | BE | 3A | F6 | 3C | 3A | BE | 3B | F7 | 3C | 3B | 3A | 3C | 26 | F2 | 81 |
| 00D0 | 4F | 05 | 01 | 00 | 49 | 0F | 02 | 00 | 49 | 81 | 14 | 72 | 18 | 72 | 05 | 3F |
| 00E0 | 05 | 05 | 6C | 02 | 1A | 68 | 3F | 69 | 3F | 6A | 3F | 6B | 81 | 1F | 03 | 16 |
| 00F0 | 05 | 1A | 01 | 17 | 01 | BD | 88 | BD | 88 | B6 | 77 | 46 | BD | 80 | 46 | BD |
| 0100 | 80 | B6 | 3B | B7 | 3C | 38 | 3C | 38 | 3C | 38 | 3C | A6 | 08 | 38 | 3C | BD |
| 0110 | 80 | 4A | 26 | F9 | 17 | 05 | A6 | 20 | 1B | 01 | 20 | 02 | BD | 88 | 06 | 01 |
| 0120 | 00 | 79 | 69 | 01 | 69 | 02 | 69 | 03 | 4A | 26 | F1 | 9F | AB | 04 | 97 | 3C |
| 0130 | 3B | 1E | 03 | 81 | BD | 8D | AE | 2E | 20 | 04 | BD | 8D | AE | 30 | 12 | 72 |
| 0140 | B6 | 2D | B7 | 65 | B6 | 28 | B7 | 3C | 20 | 1E | BD | 8D | B6 | 29 | B7 | 3C |
| 0150 | AE | 56 | B6 | 2B | 20 | 0E | 1A | 00 | 20 | 2A | BD | 8D | B6 | 2A | B7 | 3C |
| 0160 | AE | 5B | B6 | 2C | 27 | F0 | B7 | 65 | 1A | 00 | A6 | 02 | B7 | 3D | A6 | 8C |
| 0170 | B7 | 08 | A6 | 07 | B7 | 09 | 8F | A6 | 08 | 4A | 26 | FD | 3A | 3D | 26 | EE |
| 0180 | 3A | 65 | 26 | E6 | A6 | 60 | B7 | 09 | 02 | 72 | 2A | A6 | FF | B7 | 75 | A6 |
| 0190 | 05 | B7 | 44 | BF | 39 | 21 | FE | BE | 39 | F6 | A4 | 0F | A1 | 0F | 26 | 03 |
| 01A0 | CC | 02 | 62 | B1 | 75 | 26 | 08 | A6 | 0F | B7 | 75 | A6 | 24 | 20 | 05 | B7 |
| 01B0 | 75 | 48 | AB | 10 | 97 | F6 | B7 | 37 | B7 | 45 | E6 | 01 | B7 | 38 | 0E | 72 |
| 01C0 | 3A | A6 | FC | B7 | 07 | A6 | 94 | B7 | 03 | B6 | 38 | B7 | 08 | 3F | 09 | 8F |
| 01D0 | A6 | 02 | 9D | 4A | 26 | FD | A6 | 9C | B7 | 03 | B6 | 38 | B7 | 08 | 3F | 09 |
| 01E0 | 8F | B6 | 38 | B7 | 08 | 3F | 09 | 8F | A6 | 02 | 9D | 9D | 4A | 26 | FD | 01 |
| 01F0 | 72 | 12 | 0F | 01 | 0A | A6 | 60 | B7 | 09 | 20 | 65 | A6 | EC | 20 | C4 | 1E |
| 0200 | 37 | 9D | 20 | 08 | 9D | 9D | 9D | 9D | 9D | 9D | 21 | FE | A6 | 84 | B7 | 03 |
| 0210 | B6 | 38 | B7 | 08 | 3F | 09 | 8F | A6 | 02 | 9D | 4A | 26 | FD | A6 | 80 | B7 |
| 0220 | 03 | B6 | 38 | B7 | 08 | 3F | 09 | 8F | B6 | 38 | B7 | 08 | 3F | 09 | 8F | 21 |
| 0230 | FE | 9D | 9D | 9D | 9D | 3A | 37 | 26 | 0B | 3A | 3C | 27 | 12 | B6 | 45 | B7 |
| 0240 | 37 | CC | 01 | C5 | 9D | 21 | FE | 9D | 9D | 9D | 9D | 9D | CC | 01 | C5 | 9D |
| 0250 | 9D | 9D | 9D | 21 | FE | A6 | 84 | B7 | 03 | A6 | 01 | B7 | 3C | 03 | 72 | 07 |
| 0260 | 13 | 72 | A6 | 94 | B7 | 03 | 81 | 3A | 44 | 27 | F7 | 3C | 39 | A6 | 07 | 4A |
| 0270 | 9D | 26 | FC | CC | 01 | 95 | A6 | 60 | B7 | 09 | 80 | 04 | 68 | 7B | 06 | 68 |
| 0280 | 03 | CC | 03 | 8D | BD | DO | B8 | 77 | 27 | 05 | 1C | 09 | CC | 06 | 17 | 0B |
| 0290 | 68 | 08 | 0B | 3F | 05 | 07 | 00 | 02 | BD | DE | 17 | 68 | AE | 01 | A6 | FE |
| 02A0 | B7 | 3D | B7 | 02 | 09 | 02 | 38 | 5C | 0B | 02 | 34 | 5C | 0D | 02 | 30 | 5C |
| 02B0 | 39 | 3D | B6 | 3D | B7 | 02 | 08 | 3D | EB | 03 | 68 | 15 | 3A | 66 | 26 | 11 |
| 02C0 | 11 | 68 | 13 | 68 | A6 | 21 | B7 | 04 | 10 | 00 | 0E | 68 | 04 | 15 | 6C | 3F |
| 02D0 | 70 | 81 | B7 | 67 | 12 | 68 | A6 | 01 | B7 | 66 | 81 | A6 | 03 | 20 | F9 | BF |
| 02E0 | 73 | 9F | 03 | 68 | ED | B1 | 67 | 26 | D3 | 00 | 68 | EF | 3C | 66 | A6 | 03 |
| 02F0 | B1 | 66 | 26 | DD | 10 | 68 | 14 | 68 | 81 | 15 | 68 | 1D | 03 | B6 | 73 | A1 |
| 0300 | 0A | 27 | 6E | A1 | 0C | 26 | 1D | A6 | E0 | B7 | 04 | B6 | 76 | B7 | 00 | 1D |
| 0310 | 68 | AE | 55 | 5C | A3 | 60 | 24 | 4D | F6 | 2A | F8 | BF | 74 | B6 | 42 | B7 |
| 0320 | 71 | 18 | 68 | 81 | A1 | 0B | 26 | 02 | 3F | 73 | 09 | 43 | 10 | B1 | 63 | 26 |
| 0330 | 0C | B6 | 62 | B1 | 74 | 27 | 4B | AB | 05 | B1 | 74 | 27 | 45 | 0B | 43 | 06 |
| 0340 | B6 | 73 | B1 | 61 | 27 | 3C | A6 | E0 | B7 | 04 | B6 | 76 | B7 | 00 | 1D | 68 |
| 0350 | 09 | 68 | 19 | B6 | 73 | BE | 74 | AA | 80 | F7 | 5C | A3 | 60 | 24 | 06 | F6 |
| 0360 | 2A | F8 | BF | 74 | 81 | 19 | 68 | A6 | C0 | B7 | 71 | 81 | B6 | 42 | B7 | 71 |
| 0370 | 81 | 0D | 04 | 03 | 0C | 00 | 15 | 0D | 71 | 08 | 1B | 72 | BD | DA | 9C | CC |
| 0380 | 05 | 62 | A6 | E6 | B7 | 04 | B6 | 76 | B7 | 00 | 1D | 68 | 81 | 16 | 68 | B6 |
| 0390 | 6A | A4 | 1E | 27 | 04 | 1D | 07 | 20 | 02 | 1C | 07 | B6 | 6C | B7 | 6D | 01 |
| 03A0 | 01 | 0F | 01 | 6D | 08 | 3A | 6E | 27 | 13 | 10 | 6C | 20 | 11 | 3F | 6E | 20 |
| 03B0 | 0B | 00 | 6D | F5 | 3C | 6E | A6 | 03 | B1 | 6E | 27 | ED | 11 | 6C | 0F | 01 |
| 03C0 | 0F | 03 | 6D | 08 | 3A | 6F | 27 | 13 | 12 | 6C | 20 | 11 | 3F | 6F | 20 | 0B |
| 03D0 | 02 | 6D | F5 | 3C | 6F | A6 | 03 | B1 | 6F | 27 | ED | 13 | 6C | 0F | 43 | 12 |
| 03E0 | 08 | 00 | 12 | 05 | 6D | 08 | 3A | 70 | 27 | 16 | 14 | 6C | 20 | 14 | 3F | 70 |
| 03F0 | 20 | 0E | 08 | 00 | EE | 04 | 6D | F2 | 3C | 70 | A6 | 03 | B1 | 70 | 27 | EA |
| 0400 | 15 | 6C | B6 | 6D | B8 | 6C | 27 | 62 | 1B | 72 | 10 | 04 | 1D | 03 | 46 | 24 |
| 0410 | 2D | 01 | 6C | 2C | 1E | 68 | BD | DE | 05 | 6C | 14 | 07 | 3F | 0B | 05 | 72 |

by one. The loop formed between decision block 240 and block 230 continues until SMPNM is no longer between 0.82 T1 and 0.94 T1 that is when the sample no longer occurs during bite 80. When this occurs, the flow chart proceeds to a decision block 250 which tests to see if SMPNM is greater than 100. If the answer is no, another sample is taken and correlated in accordance with block 220. When SMPNM finally exceeds 100, that is when the T1 observation interval is complete, then the decision reached by decision block 250 is affirmative and the flow chart proceeds to stop at block 260.

Thus, it is seen that by following the above flow chart in accordance with the present invention, an incoming received tone signal is sampled and the samples are correlated during a modified substantially rectangular observation window with a carefully positioned bite therein to detect the presence of a received tone signal exhibiting a predetermined frequency. The sequence of such flow chart is repeated as many times as is necessary while the presence of a received tone signal exhibiting a predetermined frequency is being determined.

Figure 14:
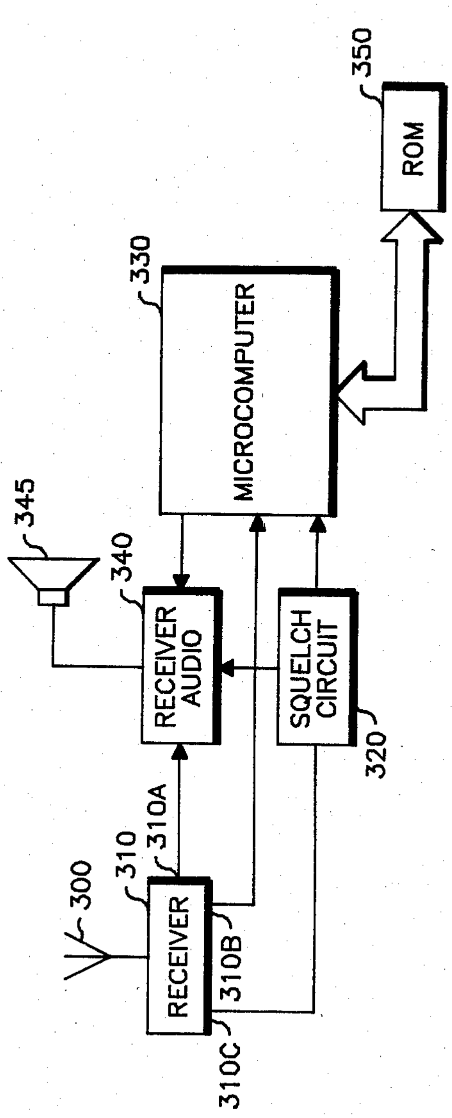
FIG. 14 is a block diagram of an embodiment of the invention which employs a micro-computer.

FIG. 14 is a simplified blocked diagram of a microcomputer embodiment of a radio frequency receiver incorporating the present invention to detect the presence of a received tone signal exhibiting a predetermined frequency. The many different tone signalling schemes known in the art today require apparatus and methods for distinguishing received toned signals exhibiting a selected frequency from received signals exhibiting other frequencies in order to perform selected functions at the receiver, for example opening a squelch circuit as well as other functions.

The apparatus of FIG. 14 includes an antenna 300 for gathering radio frequency signals incident thereon and providing such signals to a receiver 310 coupled thereto. Receiver 310 demodulates the radio frequency signals coupled thereto and provides the demodulated signals, that is received tone signals to outputs 310A and 310B thereof. A receiver output 310C couples a signal which indicates the presence of a radio frequency carrier signal at receiver 310 to the input of a squelch circuit 320. One output of squelch circuit 320 is coupled to an input of a microcomputer 330. Microcomputer 330 supervises and controls the operation, for example, noise squelch and decoding functions, of the remaining functions of the receiver of FIG. 14. Microcomputer 330 includes a random access memory (not shown) therein for storing digital signal information and includes a plurality of registers (not shown) for facilitating processing of such information.

Another output of squelch circuit 320 is electrically coupled to one input of a receiver audio circuit 340. Receiver output 310A is coupled to an input of receiver audio circuit 340. One output of microcomputer 330 is also coupled to an input of receiver audio circuit 340 to control the operation thereof. Receiver output 310B is coupled to an input of microprocessor 330.

A read only memory 350, also referred to as a code plug, is conveniently encoded with a wide variety of information regarding the operation of the microcomputer controlled receiver of FIG. 14. More specifically, certain functions to be performed by the receiver of FIG. 14 are encoded into read only memory 350. In this embodiment, read only memory 350 contains information which tells the microcomputer 330 which sequence of received audio tones of predetermined frequency must be received and processed by microcomputer 330 before microcomputer 330 will permit squelch circuit 320 to turn on the receiver audio of circuit 340 to provide voice messages subsequent to an encoded tone sequence to reach loudspeaker 345 where such messages are audible to the receiver user. It is apparent that the sampling and correlation of samples of the received signal in accordance with the modified substantially rectangular observation window employed in the present invention is conveniently implemented by microprocessor 330. In this manner, the first side lobe response of each tone signal which the receiver of FIG. 14 is to receive, in sequence or otherwise, is significantly reduced such that the likelihood of signal falsing substantially diminished. From the above discussion, it is clear that the present invention not only applies to reducing the side lobe response of a single tone exhibiting a predetermined frequency, but may also be employed to reduce the first side lobe response to each of a sequence of received tone signals exhibiting respective predetermined frequencies.

Advantageously, during the bite of the observation interval employed in the present invention, microcomputer 330 is now free to perform tasks other than sampling and correlating. This is so because during the bite interval, it is assured that all samples will be weighted zero, a task which can be accomplished all together at the beginning of the bite interval, leaving the remainder of each bite interval of each observation interval free for the performance of other tasks by the microcomputer 330. Such other tasks include monitoring and control of the radio receiver circuits and operating conditions and functions of the same, for example. In lieu of performing such tasks during the remainder of the bite interval, microcomputer 330 assumes an idle mode to decrease power consumption.

Figure 15:
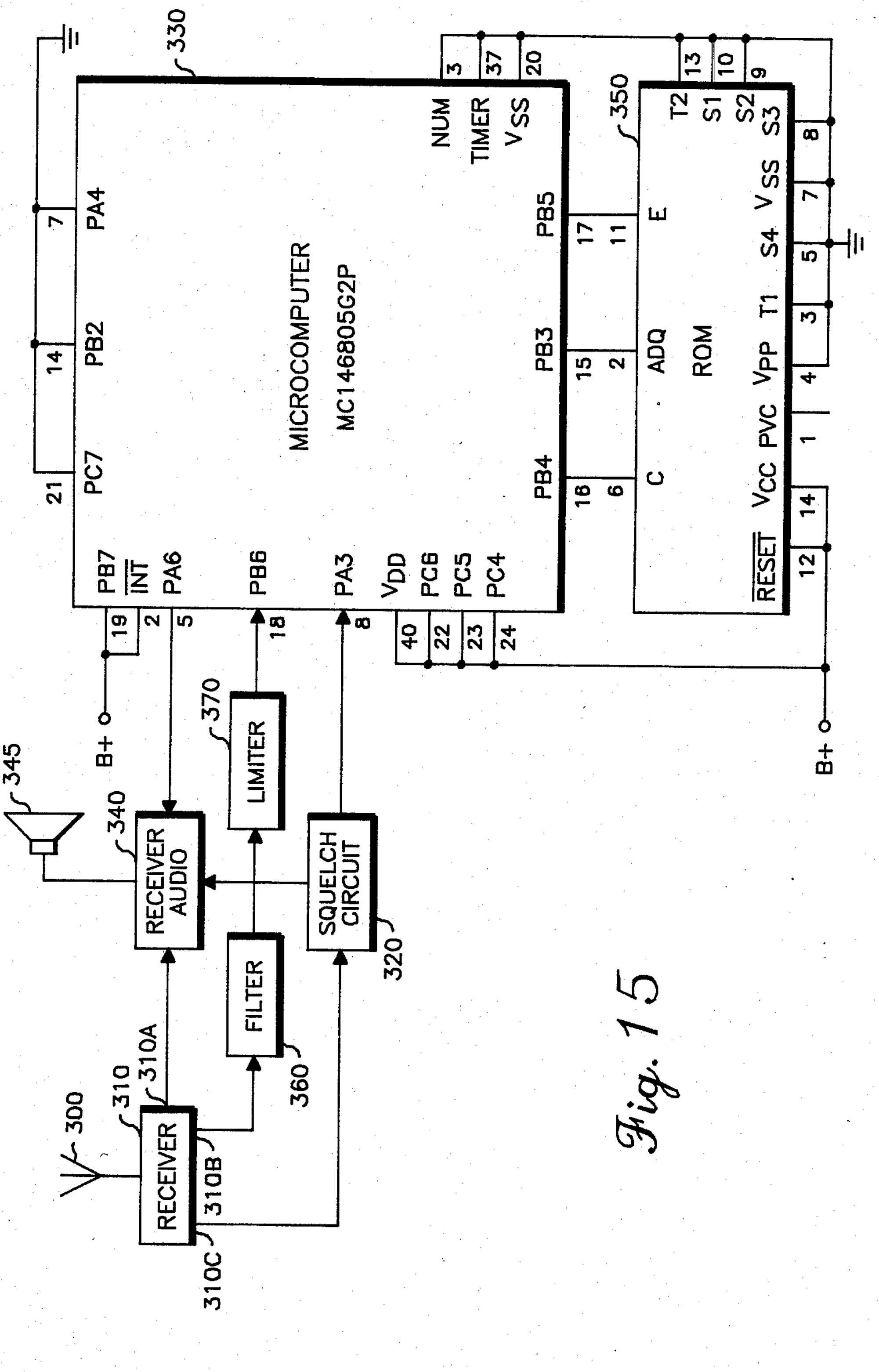
FIG. 15 is a more detailed block diagram of the apparatus of FIG. 14.

FIG. 15 is a more detailed representation of a microcomputer-firmware embodiment of the apparatus of the present invention. The representation of FIG. 15 is substantially identical to the block diagram of FIG. 14 except for the following modifications and additions to detail. A filter 360 and a limiter 370 are coupled together in series between receiver output 310B and an input of microcomputer 330. The Motorola MC147805G2P microcomputer is employed as microprocessor 330 in the firmware embodiment of the invention shown in FIG. 15. The actual pin terminal numbers of microcomputer 330 are shown circled adjacent the periphery of the rectangular block representing microcomputer 330. Further, an associated alphanumeric designation is situated next to each of such circled pin numbers for ease of identification. Those skilled in the art will readily understand how to employ the aforementioned microcomputer to utilize the frequency decoder of the present invention. For detailed information on the operation of the aforementioned microcomputer, reference may be made to the "M6805/M146805 Family Microcomputer/Microprocessor User's Manual" published by Motorola, Inc. 3501 Ed Bluestein Blvd., Austin, Tex. 78721, the contents of which are incorporated herein by reference. Even more detailed information regarding this microcomputer is conveniently found in the "Motorola Microprocessor Data Manual" in the section entitled "MC146805G2", the contents of which are also incorporated herein by reference.

Microcomputer pins 19 and 2, respectively designated PB7 and $\overline{\text{INT}}$ are electrically coupled to a power supply. Pin 5, designated PA6 is coupled to an input of receiver audio circuit 340. Pin 18 designated PB6 is coupled to limiter circuit 370 as shown in FIG. 15. Pin TABLE 3-continued

| | | | | | | | | | | | | | | | | |
|---|---|---|---|---|---|---|---|---|---|---|---|---|---|---|---|---|
| 0420 | 19 | 08 | 3F | 05 | 08 | 72 | 0E | 18 | 72 | 16 | 72 | B6 | 43 | 20 | 61 | 14 |
| 0430 | 72 | 18 | 72 | 20 | E6 | 16 | 72 | 9C | 20 | 76 | 14 | 72 | 20 | 1A | 1B | 68 |
| 0440 | 46 | 24 | 09 | 03 | 6C | 06 | 1F | 04 | B6 | 42 | 20 | 44 | 46 | 24 | 1A | 1F |
| 0450 | 68 | 04 | 6C | 07 | 14 | 72 | 18 | 72 | 1D | 04 | 81 | 15 | 72 | 19 | 72 | 1C |
| 0460 | 04 | 0F | 43 | 03 | 1D | 00 | 81 | 1C | 00 | 81 | B6 | 35 | 48 | BB | 69 | B7 |
| 0470 | 69 | 4F | B9 | 6A | B7 | 6A | 4F | B9 | 6B | B7 | 6B | 0C | 43 | 0E | B1 | 60 |
| 0480 | 26 | E7 | OB | 68 | E4 | 1F | 68 | AD | D2 | 1B | 68 | 81 | B6 | 6A | 20 | EE |
| 0490 | B7 | 3A | 9C | A6 | 21 | B7 | 04 | B6 | 3A | A4 | 0C | A1 | 08 | 26 | 3D | 06 |
| 04A0 | 72 | 03 | CC | 05 | 39 | 03 | 3A | 08 | 00 | 3A | 0B | CD | 01 | 34 | 20 | 0C |
| 04B0 | A6 | 60 | B7 | 09 | 20 | 06 | 03 | 01 | F2 | CD | 01 | 3A | 1A | 00 | 1D | 03 |
| 04C0 | A6 | FF | B7 | 08 | A6 | 05 | B7 | 09 | 8F | 01 | 01 | 0A | 3A | 6E | 26 | F0 |
| 04D0 | 17 | 72 | 11 | 6C | 20 | 3F | A6 | 03 | B7 | 6E | 20 | E4 | 05 | 3A | 0E | 06 |
| 04E0 | 3A | 05 | CD | 01 | 34 | 20 | 06 | 03 | 01 | F8 | CD | 01 | 3A | 01 | 3A | 35 |
| 04F0 | 03 | 3A | 0F | 0D | 71 | 32 | CD | 01 | 4A | CD | 01 | 5A | 20 | 10 | 9D | 9D |
| 0500 | 20 | 13 | 0F | 71 | 2B | CD | 01 | 5A | OD | 71 | 03 | CD | 01 | 4A | 0A | 42 |
| 0510 | ED | B6 | 42 | B7 | 71 | A6 | CE | B7 | 07 | A6 | 84 | B7 | 03 | 06 | 72 | 9C |
| 0520 | 1B | 00 | CC | 06 | 6A | 02 | 3A | 05 | 0F | 71 | 05 | 20 | CC | 0C | 71 | DB |
| 0530 | 06 | 72 | DB | 04 | 42 | D8 | CC | 06 | D8 | 03 | 3A | 10 | 00 | 3A | 05 | CD |
| 0540 | 01 | 34 | 20 | D1 | 03 | 01 | F8 | CD | 01 | 3A | 20 | C9 | 10 | 72 | 01 | 3A |
| 0550 | 08 | 03 | 01 | 05 | CD | 01 | 3A | 20 | 03 | CD | 01 | 34 | 11 | 72 | 13 | 6C |
| 0560 | 20 | B3 | 09 | 42 | A6 | 20 | 8F | 9C | BD | 8D | A6 | 01 | B7 | 3C | A6 | 04 |
| 0570 | B7 | 65 | A6 | 80 | B7 | 72 | AE | 32 | CD | 01 | 68 | 1B | 00 | CC | 06 | 17 |
| 0580 | A6 | 60 | B7 | 09 | 1D | 03 | 1E | 68 | 0C | 72 | 10 | 01 | 3F | 0D | CD | 01 |
| 0590 | 5A | A6 | CE | B7 | 07 | A6 | 84 | B7 | 03 | 1B | 00 | 03 | 3F | 30 | 1A | 72 |
| 05A0 | 1C | 68 | OD | 72 | 47 | A6 | D2 | B7 | 3C | A6 | E2 | B7 | 04 | B6 | 76 | B7 |
| 05B0 | 00 | A6 | 5D | B7 | 08 | A6 | 06 | B7 | 09 | CD | 02 | 7B | 8F | 21 | FE | 0B |
| 05C0 | 72 | 0C | 0D | 68 | 13 | 3A | 3C | 27 | 05 | 0C | 72 | E5 | 20 | 38 | 1B | 72 |
| 05D0 | 1D | 68 | A6 | 21 | B7 | 04 | 10 | 00 | 0D | 72 | 0C | 0D | 3F | 04 | 1C | 07 |
| 05E0 | 1C | 03 | BD | DA | CC | 06 | 6A | 0F | 3F | F8 | 20 | F2 | A6 | 7D | B7 | 3C |
| 05F0 | A6 | 12 | B7 | 3B | A6 | E4 | 87 | 04 | B6 | 76 | B7 | 00 | A6 | 9C | B7 | 08 |
| 0600 | A6 | 06 | B7 | 09 | 20 | B3 | 3A | 3B | 26 | F2 | 00 | 04 | E8 | A6 | 07 | B7 |
| 0610 | 3B | 10 | 04 | 10 | 00 | 20 | E5 | 9C | A6 | 21 | B7 | 04 | A6 | 01 | B7 | 00 |
| 0620 | A6 | 30 | B7 | 05 | A6 | 0F | B7 | 06 | A6 | CE | B7 | 07 | A6 | 84 | B7 | 03 |
| 0630 | 4F | B7 | 01 | B7 | 02 | 87 | 6C | B7 | 6E | B7 | 6F | B7 | 70 | B7 | 72 | B7 |
| 0640 | 68 | 9A | BD | DO | B7 | 77 | A6 | 0A | B7 | 3B | AE | 3E | A6 | 0A | B7 | 3D |
| 0650 | BD | ED | 3A | 3D | 26 | FA | 86 | 44 | 8B | 45 | A1 | A5 | 26 | E4 | B6 | 42 |
| 0660 | B7 | 71 | 4F | 0F | 43 | 02 | A6 | C0 | 87 | 76 | 9C | B6 | 40 | B7 | 45 | 86 |
| 0670 | 3E | B7 | 39 | 3F | 37 | 1D | 72 | A6 | 60 | B7 | 09 | CD | 08 | 28 | 3F | 3C |
| 0680 | 3F | 3D | AE | 10 | CD | 08 | 17 | AE | 23 | CD | 08 | 17 | B6 | 22 | B7 | 14 |
| 0690 | B6 | 20 | B7 | 12 | B6 | 21 | B7 | 13 | B6 | 34 | B7 | 26 | B6 | 35 | 44 | 44 |
| 06A0 | 44 | B7 | 27 | A6 | 70 | B7 | 08 | 3F | 09 | 3F | 36 | B6 | 14 | B0 | 27 | 2B |
| 06B0 | 12 | 1A | 36 | 26 | 04 | B6 | 35 | 20 | 0B | B7 | 14 | BE | 27 | B6 | 35 | B7 |
| 06C0 | 27 | 20 | 0B | 40 | B7 | 27 | BE | 14 | B6 | 22 | B7 | 14 | 14 | B6 | 8F | CD |
| 06D0 | 07 | 3C | 04 | 36 | 03 | CD | 02 | 7B | B6 | 36 | A4 | 09 | 26 | 05 | 03 | 36 |
| 06E0 | C8 | 20 | 87 | 07 | 36 | 05 | 01 | 39 | 02 | 1C | 72 | 3C | 37 | 34 | 39 | B6 |
| 06F0 | 41 | B1 | 37 | 26 | 82 | CC | 05 | 80 | B6 | 32 | 8B | 29 | B7 | 29 | B6 | 31 |
| 0700 | B9 | 28 | B7 | 28 | 0D | 01 | 18 | 2B | 0B | 0C | 28 | 04 | 3C | 2A | 20 | 27 |
| 0710 | 3C | 2B | 20 | 23 | 0C | 28 | 04 | 3C | 2C | 20 | 1C | 3C | 2D | 20 | 18 | 2B |
| 0720 | 0B | 0C | 28 | 04 | 3A | 2A | 20 | OF | 3A | 2B | 20 | 0B | 0C | 28 | 04 | 3A |
| 0730 | 2C | 20 | 04 | 3A | 2D | 20 | 00 | 5A | 27 | 42 | 21 | 00 | B6 | 1F | BB | 16 |
| 0740 | B7 | 16 | B6 | 1E | B9 | 15 | B7 | 15 | 0D | 01 | 18 | 2B | 0B | 0C | 15 | 04 |
| 0750 | 3C | 17 | 20 | A4 | 3C | 18 | 20 | A0 | 0C | 15 | 04 | 3C | 19 | 20 | 99 | 3C |
| 0760 | 1A | 20 | 95 | 2B | 0B | 0C | 15 | 04 | 3A | 17 | 20 | 8C | 3A | 18 | 20 | 88 |
| 0770 | 0C | 15 | 04 | 3A | 19 | 20 | 81 | 3A | 1A | CC | 06 | F8 | A6 | AD | C7 | 00 |
| 0780 | 08 | A6 | 02 | B7 | 09 | B6 | 1C | BB | 16 | B7 | 16 | B6 | 1B | B9 | 15 | B7 |
| 0790 | 15 | B6 | 2F | 8B | 29 | B7 | 29 | B6 | 2E | B9 | 28 | B7 | 28 | 05 | 36 | 05 |
| 07A0 | AE | 10 | CD | 07 | AE | 0B | 36 | 05 | AE | 23 | CD | 07 | AE | 81 | E6 | OC |
| 07B0 | B7 | 25 | E6 | 08 | E0 | 0A | B7 | 3C | E6 | 07 | EO | 09 | B7 | 3B | 8B | 3C |
| 07C0 | 00 | 25 | 01 | 47 | 87 | 3D | B6 | 3B | 80 | 3C | 00 | 25 | 01 | 47 | B7 | 3C |
| 07D0 | EB | 01 | 2A | 01 | 40 | B7 | 3B | B6 | 3D | FB | 2A | 01 | 40 | 8B | 3B | E1 |
| 07E0 | 0D | 23 | 10 | 6A | 03 | 26 | 14 | A3 | 10 | 26 | 04 | 10 | 36 | 20 | 0C | 16 |
| 07F0 | 36 | 20 | 08 | E6 | 03 | E1 | 11 | 27 | 02 | 6C | 03 | B6 | 37 | 27 | 15 | 0A |
| 0800 | 36 | 12 | 3A | 12 | 26 | 0E | A1 | 01 | 26 | 08 | B6 | 20 | B7 | 12 | 3A | 45 |
| 0810 | 26 | 02 | 12 | 36 | 00 | 25 | 07 | B6 | 3D | F7 | B6 | 3C | E7 | 01 | 4F | E7 |
| 0820 | 07 | E7 | 08 | E7 | 09 | E7 | 0A | 81 | A6 | 1B | B7 | 3A | 0E | 3E | 03 | 0C |
| 0830 | 72 | 37 | 01 | 39 | 02 | A6 | 4E | B7 | 3A | B6 | 1B | 00 | 36 | 02 | B6 | 2E |
| 0840 | B7 | 3D | B6 | 37 | 48 | B7 | 3B | AE | 1B | BD | ED | BD | ED | A6 | 2E | B7 |
| 0850 | 3B | BD | BD | B6 | 37 | 27 | 2A | B6 | 1B | B1 | 3D | 26 | 04 | A6 | 1B | ED |
| 0860 | B7 | B6 | 2E | B1 | 3D | 26 | 1A | 20 | 0A | B6 | 2E | B1 | 4E | 26 | 0A | A6 |
| 0870 | 1B | BD | B7 | A6 | 2E | BD | B7 | 20 | 08 | A6 | 1B | BD | AF | A6 | 2E | BD |
| 0880 | AF | 81 | 00 | 00 | 00 | 00 | 00 | 00 | 00 | 00 | 00 | 00 | 00 | 00 | 00 | 00 |
| 0890 | 43 | 6F | 70 | 79 | 72 | 69 | 67 | 68 | 74 | 20 | 31 | 39 | 38 | 32 | 20 | 20 |
| 08A0 | 4D | 6F | 74 | 6F | 72 | 6F | 6C | 61 | 20 | 49 | 6E | 63 | 2E | 20 | 20 | 20 |
| 1FF0 | 00 | 00 | 00 | 00 | 00 | 00 | 02 | 76 | 06 | 17 | 05 | 67 | 06 | 17 | 06 | 17 |

TABLE 4

| | | | | | | | | | | | | | | | |
|---|---|---|---|---|---|---|---|---|---|---|---|---|---|---|---|
| 9A | 01 | 29 | 33 | 40 | 0D | 04 | 5C | 9A | 01 | 29 | 33 | 40 | 0D | 04 | 5C |
| 9A | 01 | 29 | 33 | 40 | 0D | 04 | 5C | 9A | 01 | 29 | 33 | 40 | 0D | 04 | 5C |
| 9A | 01 | 29 | 33 | 40 | 0D | 04 | 5C | 00 | 2E | 01 | 05 | C0 | 0A | A0 | 05 |
| E4 | 91 | 2A | 3C | 92 | 0D | 04 | 55 | BF | 49 | 26 | 37 | E9 | 0D | 04 | 55 |

TABLE 4-continued

| | | | | | | | | | | | | | | | |
|---|---|---|---|---|---|---|---|---|---|---|---|---|---|---|---|
| 80 | 80 | 09 | 09 | 09 | 0A | 01 | 09 | 09 | 09 | 05 | AA | AA | AA | 00 | 00 |
| A7 | 0D | 4A | 64 | 51 | 57 | 59 | 4A | 62 | 3E | 6B | 34 | 75 | 2B | 80 | 22 |
| 8B | 1A | 9A | 13 | B7 | 07 | C3 | 03 | 05 | 01 | 01 | 04 | 04 | 04 | 54 | 52 |
| 54 | 52 | 0A | 05 | 09 | 09 | 09 | 00 | 00 | 00 | 00 | 00 | 00 | 00 | 00 | 79 |

From the above description, it is clear that the invention includes a method of processing a particular signal to determine if such particular signal exhibits a predetermined frequency. This method, although described above in detail, is now briefly summarized. The method includes the step of generating an observation interval signal. The method further includes the step of sampling the particular signal during the observation window established by the observation interval signal to produce samples of the particular signal. The present method includes the step of ignoring a portion of the samples of the particular signal occurring in time near the beginning, or alternatively, near the end of said observation window, and the step of correlating the samples of the particular signal with a predetermined pattern to detect the presence of a signal exhibiting the predetermined frequency.

The foregoing describes a digitally sampling decoder circuit which detects the presence of a signal exhibiting a predetermined frequency in a manner achieving a substantial response at a selected predetermined frequency while diminishing the undesired side lobe response. The presence or absence of a signal exhibiting the predetermined frequency is determined without consuming large quantities of computational processing time.

While only certain preferred features of the invention have been shown by way of illustrations, many modifications and changes will occur to those skilled in the art. It is, therefore, to be understood that the present claims are intended to cover all such modifications and changes as fall within the true spirit of the invention.

What is claimed is:

1. A decoder circuit for detecting the presence of a signal exhibiting a predetermined frequency, comprising:

timing means for generating observation interval signals;

sampling means, responsive to said timing means, for sampling a first signal to produce samples thereof including a first sample during a substantially rectangular observation interval, said sampling means including means for ignoring a portion of said samples occurring near the beginning of said observation interal and after said first sample, and correlation means, electrical coupled to said sampling means, for correlating said samples with a predetermined pattern to detect the presence of a signal exhibiting said predetermined frequency within said first signal.

2. The circuit of claim 1 wherein said means for ignoring further includes means for dropping a plurality of successive samples within a bite interval occurring in a portion of said observation interval, said bite interval having its center located between approximately 0.02 T1 and 0.28 T1, wherein T1 is defined to be the time duration of the observation interval.

3. The circuit of claim 1 including means, responsive to said ignoring means, for performing operations other than said sampling and said correlating during times at which ignoring means is ignoring samples.

4. The circuit of claim 3 wherein said means for performing includes means, responsive to said ignoring means, for assuming an idle mode for purposes of reducing circuit power consumption.

5. The circuit of claim 1 wherein said means for ignoring establishes a bit interval occurring within said observation interval between approximately 0.06 T1 and approximately 0.18 T1, wherein T1 is defined to be the time duration of the observation interval.

6. The circuit of claim 1 wherein said means for ignoring establishes a bite interval centered at approximately 0.12 T1 in the observation interval wherein T1 is defined to be the time duration of the observation interval.

7. The circuit of claim 1 wherein said ignoring means further includes weighting means, coupled to said sampling means, for weighting each of said unignored samples with a weighting factor consisting of a numeric constant and for weighting each of said ignored samples with a weighting factor of 0.0.

8. The circuit of claim 7 wherein said numerical constant is equal to 1.0.

9. The circuit of claim 1 wherein said portion of said samples includes a plurality of samples.

10. A decoder circuit for detecting the presence of a signal exhibiting a predetermined frequency comprising:

timing means for generating observation interval signals;

sampling means, responsive to said timing means, for sampling a first signal to produce samples thereof including a last sample during a substantially rectangular observation interval, said sampling means including means for ignoring a portion of said samples occurring prior to said last sample and near the end of said observation interval, and correlation means, electrically coupled to said sampling means, for correlating said samples with a predetermined pattern to detect the presence of a signal exhibiting said predetermined frequency within said first signal.

11. The circuit of claim 10 wherein said means for ignoring further includes means for dropping a plurality of successive samples within a bite occurring in a portion of said observation interval, said bite interval having its center located between approximately 0.72 T1 and 0.98 T1, wherein T1 is defined to be the time duration of the observation interval.

12. The circuit of claim 10 including means, responsive to said ignoring means, for performing operations other than sampling and said correlating during times at which said ignoring means is ignoring samples.

13. The circuit of claim 12 wherein said means for performing includes means, responsive to said ignoring means, for assuming an idle mode for purposes of reducing circuit power consumption.

14. The circuit of claim 10 wherein said means for ignoring establishes a bite interval occurring within said observation interval between approximately 0.82 T1 and approximately 0.94 T1, wherein T1 is defined to be the time duration of the observation interval.

15. The circuit of claim 10 wherein said means for ignoring establishes a bite interval centered at approximately 0.88 T1 in the observation interval wherein T1 is defined to be the time duration.

16. The circuit of claim 10 wherein said ignoring means further includes weighting means, coupled to said sampling means, for weighting each of said unignored samples with a weighting factor consisting of a numerical constant and for weighting each of said ignored samples with a weighting factor of 0.0.

17. The circuit of claim 16 wherein said numerical constant is equal to 1.0.

18. The circuit of claim 10 wherein said portion of said samples includes a plurality of samples.

19. A decoder circuit for detecting the presence of a a predetermined frequency within a signal, comprising:

timing means for generating observation intervals;

sampling means, responsive to said timing means, for sampling a first signal to produce samples thereof including a first sample during said obseration intervals;

sample inhibiting means, coupled to said sampling means, for inhibiting said sampling means from sampling for a predetermined portion of said observation interval, said predetermined portion of said observation interval occurring after said first sample and near the beginning of said observation interval; and correlation means, electrically coupled to said sampling means, for correlating said samples with a predetermined pattern to detect the presence of said predetermined frequency within said first signal.

20. The circuit of claim 19 wherein said sample inhibiting means further includes weighting means, coupled to said sampling means, for weighting each of said samples with a weighting factor consisting of a numerical constant.

21. The circuit of claim 20 wherein said numerical constant is equal to 1.0.

22. The circuit of claim 19 wherein said sample inhibiting means inhibits said sampling means from taking a plurality of successive samples.

23. The circuit of claim 22 wherein said plurality of successive samples are centered about a sample located between approximately 0.02 T1 and 0.28 T1, wherein T1 is defined to be the time duration of said observation window.

24. The circuit of claim 23 wherein said succesive samples are centered about approximately 0.88 T1.

25. The circuit of claim 23 wherein said successive samples are inhibited for approximately 0.12 T1.

26. The circuit of claim 19 further including means responsive to said sample inhibiting means for performing operations other than said correlating during times when said samples are inhibited by said sample inhibiting means.

27. The circuit of claim 26 wherein said means for performing includes means, responsive to said sample inhibiting means, for assuming an idle mode for purposes of reducing power consumption.

28. A decoder circuit for detecting the presence of a a predetermined frequency within a signal, comprising:

timing means for generating observation intervals;

sampling means, responsive to said timing means, for sampling a first signal to produce samples thereof including a last sample during said observation intervals;

sample inhibiting means, coupled to said sampling means, for inhibiting said sampling means from sampling for a predetermined portion of said observation interval, said predetermined portion of said observation interval occurring prior to said last sample and near the end of said observation interval; and correlation means, electrically coupled to said sampling means, for correlating said samples with a predetermined pattern to detect the presence of said predetermined frequency within said first signal.

29. The circuit of claim 28 wherein said sample inhibiting means further includes weighting means, coupled to said sampling means, for weighting each of said samples with a weighting factor consisting of a numerical constant.

30. The circuit of claim 29 wherein said numerical constant is equal to 1.0.

31. The circuit of claim 28 wherein said sample inhibiting means inhibits said sampling means from taking a plurality of successive samples.

32. The circuit of claim 31 wherein said plurality of successive samples are centered about a sample located between approximately 0.72 T1 and 0.98 T1, wherein T1 is defined to be the time duration of said observation window.

33. The circuit of claim 32 wherein said successive samples are centered about approximately 0.12 T1.

34. The circuit of claim 32 wherein said successive samples are inhibited for approximately 0.12 T1.

35. The circuit of claim 28 further including means responsive to said sample inhibiting means for performing operations other than said correlating during times when said samples are inhibited by said sample inhibiting means.

36. The circuit of claim 35 wherein said means for performing includes means, responsive to said sample inhibiting means, for assuming an idle mode for purposes of reducing power consumption.

37. A decoder for detecting the presence of a signal exhibiting a predetermined frequency comprising:

microcomputer means for processing sampled signal information, said microcomputer including a random access memory and a read only memory for storing information therein, and including a plurality of registers for facilitating processing of such information, said microcomputer means further including sampling means for sampling a first signal to produce samples thereof including a first sample during a substantially rectangular observation window, ignoring means, responsive to said sampling, for ignoring a portion of said samples occuring after said first sample and near the beginning of said observation window, and correlation means for correlating said samples with a predetermined pattern to detect the presence of said predetermined frequency within said first signal.

38. The decoder of claim 37 wherein said ignoring means further ncludes means for dropping a plurality of successive samples within a bite interval occurring in a portion of said observation window occurring between approximately 0.02 T1 and 0.28 T1, wherein T1 is defined to be the time duration of the observation interval.

39. The decoder of claim 37 including means, responsive to said ignoring means, for performing operations other than said sampling and said correlating during times at which said ignoring means is ignoring samples.

40. The decoder of claim 39 wherein said means for performing includes means, responsive to said ignoring means, for assuming an idle mode for purposes of reducing decoder power consumption.

41. The circuit of claim 37 wherein said ignoring means further includes weighting means, coupled to said sampling means, for weighting each of said unignored samples with a weighting factor consisting of a numerical constant and for weighting each of said ignored samples with a weighting factor of 0.0.

42. The circuit of claim 41 wherein said numerical constant is equal to 1.0.

43. The circuit of claim 37 wherein said portion of said samples includes a plurality of samples.

44. A decoder for detecting the presence of a signal exhibting a predetermined frequency comprising:

microcomputer means for processing digital signal information including a random access memory and a read only memory for storing information therein, and including a plurality of registers for facilitating processing of such information, said microcomputer means further including sampling means for sampling a first signal to produce samples thereof including a last sample during a substantially rectangular observation window, ignoring means, responsive to said sampling means, for ignoring a portion of said samples occurring prior to said last sample and near the end of said observation window, and correlating means for correlating said samples with a predetermined pattern to detect the presence of a signal exhibiting said predetermined frequency within said first signal.

45. The decoder of claim 37 44 wherein said ignoring means further includes means for dropping a plurality of successive samples within a bite interval occurring in a portion of said observation window occurring between approximately 0.72 T1 and 0.98 T1, wherein T1 is defined to be the time duration of the observation interval.

46. The decoder of claim 44 including means, responsive to said ignoring means, for performing operations other than said sampling and said correlating during times at which said ignoring means is ignoring samples.

47. The decoder of claim 46 wherein said means for performing includes means, responsive to said ignoring means, for assuming an idle mode for purposes of reducing decoder power consumption.

48. The circuit of claim 44 wherein said ignoring menas further includes weighting means, coupled to said sampling means, for weighting each of said unignored samples with a weighting factor consisting of a numerical constant and for weighting each of said ignored samples with a weighting factor of 0.0.

49. The circuit of claim 48 wherein said numerical constant is equal to 1.0.

50. The circuit of claim 44 wherein said portion of said samples includes a plurality of samples.

51. A method of processing a particular signal to determine if said particular signal exhibits a predetermined frequency comprising the steps of:

generating an observation interval signal; sampling said particular signal during the observation window established by said observation interval signal, to produce samples of said particular signal including a first sample;

ignoring a portion of the samples of said particular signal occurring in time after said first sample and near the beginning of said observation window, and correlating the samples of said particular signal which are not ignored with a predetermined pattern to detect the presence of said predetermined frequency.

52. The method of claim 51 wherein said observation window exhibits a time duration of T1 units of time and said bite interval exhibits a bite position within the range of approximately 0.06 T1 and approximately 0.18 T1.

53. A method of processing a particular signal to determine if said particular signal exhibits a predetermined frequency comprising the steps of:

generating an observation interval signal;

sampling said particular signal during the obsevation window established by said observation interval signal, to produce samples of said particular signal including a last sample;

ignoring a plurality of the samples of said particular signal occurring in time prior to said last sample and near the end of said observation window, and, correlating the samples of said particular signal which are not ignored with a predetermilned pattern to detect the presence of a signal exhibiting said predetermined frequency.

54. The method of claim 53 wherein said observation window exhibits a time duration of T1 units of time and said bite interval exhibits a bite position within the range of approximately 0.82 T1 and approximately 0.94 T1.

55. A method of providing a computer with processing time for performing other tasks when said computer is functioning as a correlator for correlating a sampled signal with a predetermined pattern to determine the presence of a predetermined frequency, said method comprising the steps of:

sampling a first signal to produce samples thereof including a first sample during a first time segment of a predetermined observation window;

interrupting said sampling for a second time segment of said predetermined observation window to enable said computer to perform said other task thereby effectively ignoring said first signal during said second time segment;

sampling said first signal for the remainder of said predetermined observation window to produce samples thereof including a last sample; and correlating said samples with said predetermined pattern to determine the presence of said predetermined frequency for a first time segment of said observation window.

56. The method of claim 55 wherein said second time segment occurs after said first sample and near the beginning of said observation window.

57. The method of claim 55 wherein said second time segment occurs prior to said last sample and near the end of said observation window.

58. The method of claim 56 wherein said second time segment is centered between approximately 0.02 T1 and 0.28 T1, wherein T1 is defined to be the duration of said observation window.

59. The method of claim 57 wherein said second time segment is centered between approximately 0.72 T1 and 0.98 T1, wherein T1 is defined to be the duration of said observation window.

* * * * *